(12) United States Patent
Vogel et al.

(10) Patent No.: US 6,220,047 B1
(45) Date of Patent: *Apr. 24, 2001

(54) SEMI-FROZEN FOOD PRODUCT PRODUCING MACHINE

(75) Inventors: James D. Vogel, Anoka; Hassan Shams, Golden Valley; Paul R. Weber, Ham Lake, all of MN (US); Rajesh Valabh, Hern Bay (NZ)

(73) Assignee: IMI Cornelius Inc., Anoka, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,683

(22) Filed: May 15, 1998

Related U.S. Application Data

(63) Continuation of application No. 08/987,395, filed on Dec. 9, 1997.

(51) Int. Cl.[7] ...................................................... A23G 9/00
(52) U.S. Cl. ................................................ 62/342; 62/59
(58) Field of Search ................................. 62/59, 306, 342

(56) References Cited

U.S. PATENT DOCUMENTS

| | | | |
|---|---|---|---|
| 3,359,748 | * 12/1967 | Booth | 62/306 |
| 3,608,779 | 9/1971 | Cornelius . | |
| 3,797,268 | * 3/1974 | Garavelli | 62/306 |
| 3,874,189 | * 4/1975 | Calim | 62/306 |
| 3,898,866 | * 8/1975 | Keyes et al. | 62/306 |
| 3,969,531 | 7/1976 | Cornelius . | |
| 4,171,819 | 10/1979 | Martineau . | |

(List continued on next page.)

*Primary Examiner*—William E. Tapolcai
(74) *Attorney, Agent, or Firm*—Sten Erik Hakanson

(57) ABSTRACT

The present invention includes a dual purpose carbonator/blending bottle connected to a source of beverage syrup, a source of potable water and to a source of pressurized carbon dioxide gas. The dual purpose bottle is retained within an ice bank water bath tank. A pair of ratio valves provide for metering the water and syrup at a desired ratio. The mixed beverage first flows through a serpentine coil, also located in water bath, and then flow into the dual purpose bottle. A refrigeration system provides for cooling an evaporator located in the water tank for forming the ice bank thereon. The carbonated beverage then flows from the bottle into a freeze cylinder. The freeze cylinder also includes a further evaporator coiled around an exterior perimeter thereof. The freeze cylinder evaporator is connected to and cooled by the same refrigeration system that cools the evaporator in the water bath tank. A scraping mechanism within the cylinder provides for scraping frozen beverage from the inner surface of the cylinder. A control mechanism provides for controlling the refrigeration system and the cooling of both evaporators. The beverage is therefore pre-cooled to a temperature just above its freezing point before delivery to the freeze cylinder. Thus, less cooling power is needed to reduce the beverage to a frozen state. The present invention utilizes a method of controlling the operation of the refrigeration system and the cooling of both evaporators thereof. The control system provides for directing refrigerant to one or the other of the evaporators as is most efficient so as to avoid short cycling or pressure build up. The present invention uses a control strategy that can more accurately maintain a pre-selected temperature differential between the inlet and outlet temperatures of the evaporators. The control algorithm utilizes a proportional integral differential control approach that safely permits a much narrower temperature difference so that a greater length of each freeze cylinder evaporator can be utilized for efficient heat transfer cooling.

38 Claims, 19 Drawing Sheets

U.S. PATENT DOCUMENTS

| | | | |
|---|---|---|---|
| 4,201,558 | * 5/1980 | Schwitters et al. | 62/306 |
| 4,398,395 | 8/1983 | Hinman et al. . | |
| 4,401,449 | 8/1983 | Martin . | |
| 4,412,428 | 11/1983 | Giannella et al. . | |
| 4,476,146 | * 10/1984 | Manfroni | 62/342 |
| 4,507,931 | * 4/1985 | Barrow et al. | 62/306 |
| 4,522,041 | * 6/1985 | Menzel | 62/342 |
| 4,736,593 | 4/1988 | Williams . | |
| 4,750,336 | 6/1988 | Margen . | |
| 4,754,609 | * 7/1988 | Black | 62/59 |
| 4,758,097 | 7/1988 | Iles, Sr. . | |
| 4,854,743 | 8/1989 | Sexton et al. . | |
| 4,854,923 | 8/1989 | Sexton et al. . | |
| 4,856,678 | 8/1989 | Stanfill et al. | 222/108 |
| 4,878,760 | 11/1989 | Newton et al. . | |
| 4,881,378 | 11/1989 | Bryant | 62/348 |
| 4,916,910 | * 4/1990 | Schroeder | 62/59 |
| 4,916,920 | 4/1990 | Weis et al. . | |
| 4,964,542 | 10/1990 | Smith . | |
| 5,030,465 | 7/1991 | Curry et al. . | |
| 5,074,125 | 12/1991 | Schifferly . | |
| 5,095,710 | 3/1992 | Black et al. . | |
| 5,295,368 | 3/1994 | Franklin . | |
| 5,323,691 | 6/1994 | Reese et al. . | |
| 5,349,825 | 9/1994 | Duke et al. . | |
| 5,535,600 | 7/1996 | Mills . | |
| 5,706,661 | 1/1998 | Frank . | |
| 5,709,095 | 1/1998 | Johnson . | |
| 5,732,563 | 3/1998 | Bethuy et al. . | |
| 5,765,726 | 6/1998 | Jones . | |

* cited by examiner

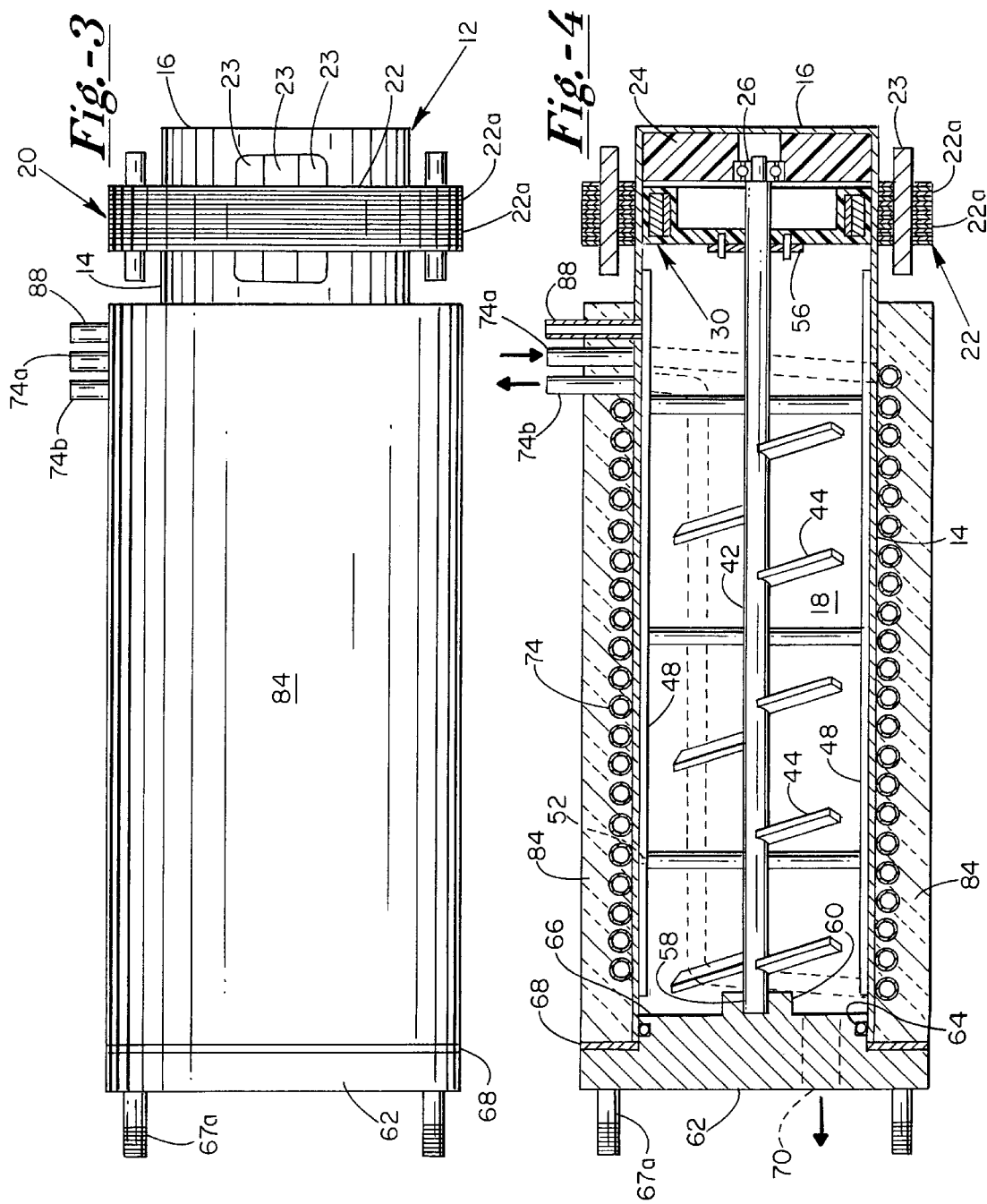

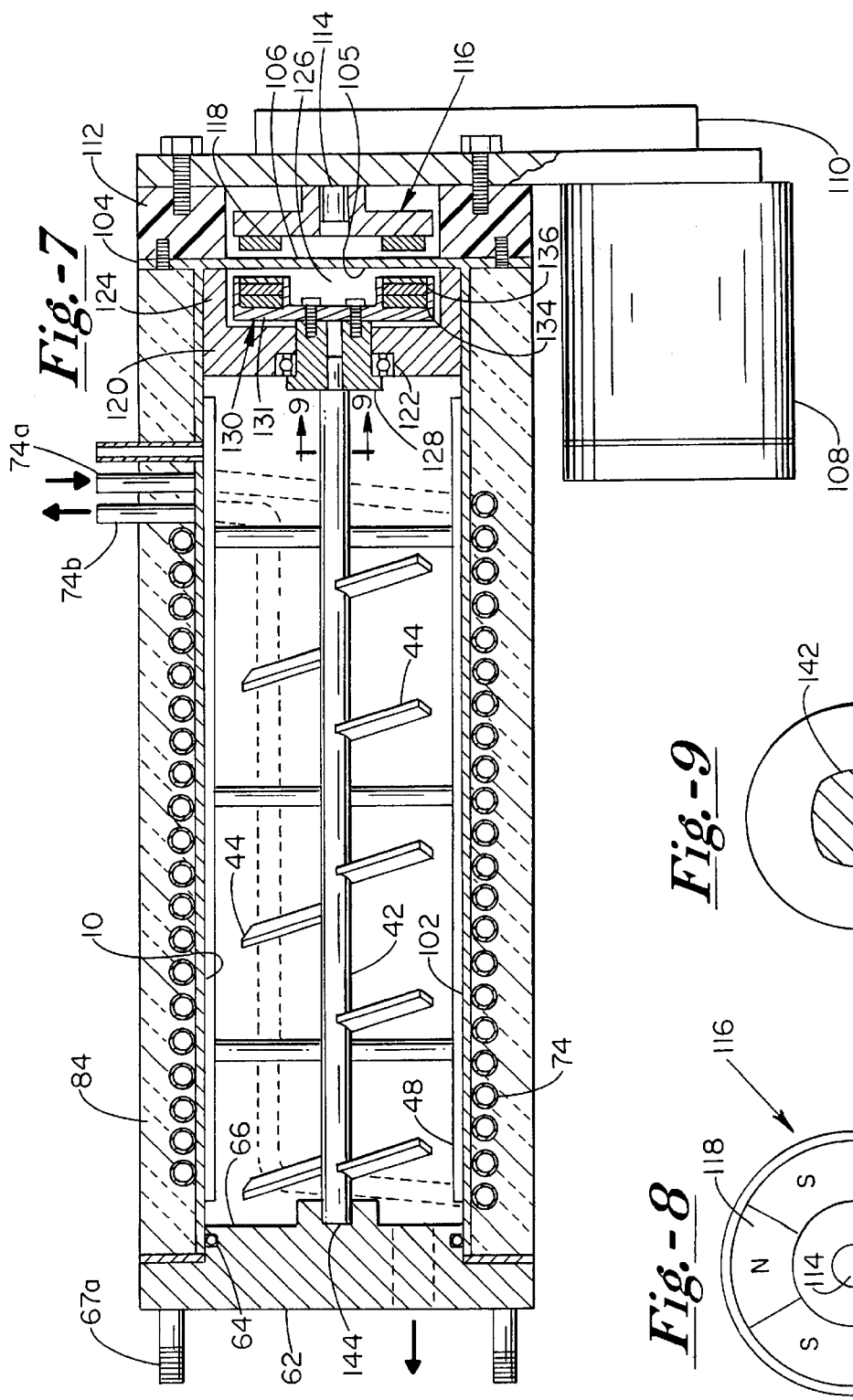

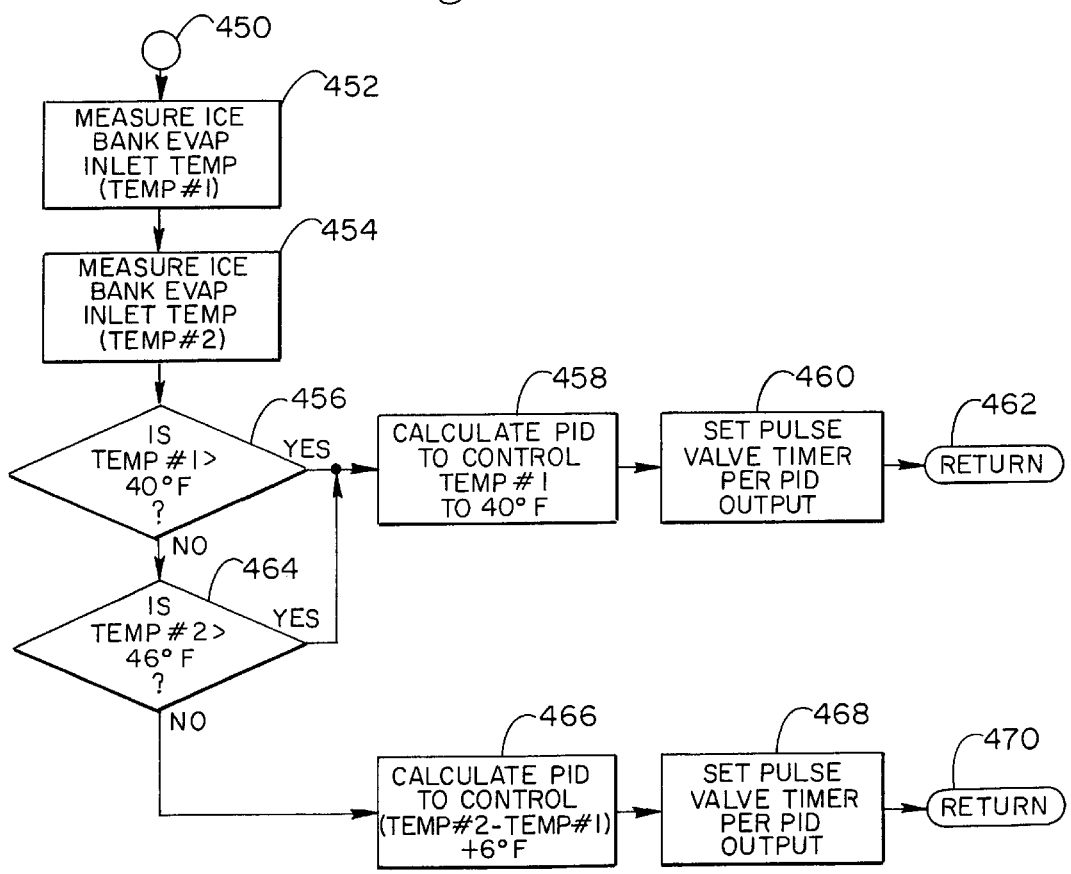

SEMI-FROZEN FOOD PRODUCT PRODUCING MACHINE

The present application is a continuation of U.S. patent application Ser. No. 08/987,395, filed Dec. 9, 1997.

FIELD OF THE INVENTION

The present invention relates to semi-frozen food product producing machines, including frozen carbonated beverage (FCB) machines, and in particular to the cooling and beverage blending systems thereof and the drive and control systems therefor.

BACKGROUND

FCB making and dispensing machines are known in the art and generally utilize a freezing cylinder for producing a slush beverage therein. An evaporator coil is wrapped around the exterior of the cylinder for cooling the contents thereof. A scraper mechanism extends along the central axis of the cylinder and is rotated to scrape thin iced or frozen layers of the beverage or food product from the internal surface of the cylinder. A carbonator tank is used to produce carbonated water by the combination therein of water and pressurized carbon dioxide gas ($CO_2$). The carbonated water and a syrup are then combined in the desired ratio and introduced into a separate blender bottle. The properly ratioed beverage is then delivered from the blender bottle into the freeze cylinder. A problem with this approach concerns the warming of the contents of the carbonator and blender bottle wherein high pressures are required to maintain the desired level of carbonation at such elevated temperatures.

An ongoing problem with FCB machines, and related to the foregoing, is the amount of cooling that is required to make and maintain a beverage in a semi-frozen state. This cooling demand is especially great during times of high use when, as drinks are being dispensed, new ambient temperature water and syrup are continually being added to the cylinder from the blender bottle. A strategy has long been needed to provide for high draw capacity in an FCB machine without resorting to the expedient of requiring ever larger refrigeration compressors and systems with their concomitant increase in machine purchase cost, cost of operation and noise of operation. A further problem with prior art FCB machines concerns their mechanical or design complexity. This complexity, in terms of numbers of parts, adds cost with respect to manufacture and maintenance, and also negatively impacts reliability. Accordingly, it would be very desirable to have an FCB machine that is less expensive and easier to manufacture and maintain.

A further drawback to FCB machines is the fact that the scraper mechanism inherently requires a shaft portion thereof to extend through a cylinder end for connection to a drive motor, thereby requiring a dynamic seal. This requirement stems from the fact that the drive mechanism is exterior of the cylinder and can not come into direct contact with the food product therein. Naturally, such seals are subject to wear and consequent leaking, especially where the beverage contents are under pressure, as is the case for a frozen carbonated beverage. Major service problems with such machines are related to failed or leaking scraper shaft seals. Accordingly, it would be very desirable to be able to eliminate such seals, yet have a scraper drive mechanism that does not create food compatibility/contact problems, and that has sufficient strength to operate the scraper against the considerable resistance it encounters when producing the desired frozen food product.

SUMMARY OF THE INVENTION:

In a preferred embodiment of the present invention, a dual purpose carbonator/blending bottle, "blendonator", is connected to a source of beverage syrup, a source of potable water and to a source of pressurized carbon dioxide gas. A pair of ratio valves provide for metering the water and syrup, which combined beverage then flows into a serpentine heat exchange coil and then into the blending bottle. Both the blending/carbonating bottle are retained within an ice bank cooled water bath tank. A refrigeration system provides for cooling an evaporator located in the water tank for forming the ice bank thereon. The blending bottle includes an outlet for connecting the interior volume thereof to a freeze cylinder. The freeze cylinder also includes a further evaporator coiled around an exterior perimeter thereof. The freeze cylinder evaporator is connected to and cooled by the same refrigeration system that cools the evaporator in the water bath tank. A scraping mechanism within the cylinder provides for scraping frozen beverage from the inner surface of the cylinder. A control mechanism provides for controlling the refrigeration system and the cooling of both evaporators.

In operation, the dual purpose blending bottle combines the functions of the separate carbonator and blending bottle system found in the prior art. Thus, the improved blender bottle serves both to carbonate the beverage and to retain a volume of a finished amount thereof. As it is located in the water bath tank, the volume of beverage therein is cooled by heat exchange transfer with the ice formed on the ice bank evaporator. A further volume of the beverage is retained in the serpentine coil and also maintained at a suitably cool temperature by heat exchange contact with the cooled water of the water bath. The beverage is therefore pre-cooled to a temperature just above its freezing point before delivery to the freeze cylinder. Thus, far less cooling power is needed to reduce the beverage to a frozen state, as would be the case in prior art FCB machines where the beverage is typically at a much higher ambient temperature just prior to its introduction into the freeze cylinder. Those of skill will understand that the ice bank provides for this extra cooling, which ice bank is formed by operation of the refrigeration system to build ice on the water bath evaporator. In the present invention, this added cooling is attained with a similar or even smaller sized refrigeration system components than would be used in comparable output prior art FCB machines. This enhanced cooling ability is obtained by the strategy of building an ice bank on the water bath evaporator ostensibly during times of non-dispense and/or when the freeze cylinder evaporator is otherwise not being cooled.

A further advantage of the present invention is seen in the method of controlling the operation of the refrigeration system and the cooling of both evaporators thereof. The control system provides for directing refrigerant to either of the evaporators as is most efficient. Thus, if the FCB machine is in a "sleep" mode overnight when no drinks will be dispensed therefrom, the control can direct all the cooling ability if the refrigeration system be utilized to build up the ice bank at that time. Also, as is known in the art, when the beverage in the cylinder has reached its maximum desired viscosity, the cooling of the freeze cylinder evaporator must be stopped. Since a semi-frozen beverage can warm quickly to an unacceptably low viscosity the compressor must then be turned back on. However, and especially where the FCB machine has more than one freeze cylinder, the compressor can be turned on and off very frequently leading to damaging short cycling thereof. However, in the present invention, rather than stop the operation of the compressor, the control herein has an option to continue the operation of the compressor to cool the ice bank evaporator if further ice bank growth is needed or can otherwise be accommodated. Thus, when cylinder cooling is again required, refrigerant can again be directed thereto whereby a short cycling thereof can be avoided. This strategy of being able to alternate cooling between the cylinder evaporators and the ice bank evaporator presents a major advantage for compressor longevity, as most, if not all, short cycling can be avoided.

A further advantage of the present invention concerns the ability of the electronic control system thereof to obtain more efficient cooling of the freeze cylinders. The present invention uses a control strategy that can more accurately maintain a pre-selected temperature differential between the inlet and outlet temperatures of the freeze cylinder evaporators. A control algorithm utilizes a proportional integral differential control approach that safely permits a much narrower temperature difference so that a greater length of each freeze cylinder evaporator can be utilized to cool the cylinder contents. Thus, the present invention, by being able to build a cooling reserve and by obtaining better cooling efficiency from the freeze cylinder evaporators, is able to accomplish more cooling with the same sized refrigeration system found in a comparable prior art machine or can accomplish the same amount of cooling with a smaller refrigeration system.

In one preferred embodiment of the present invention, a freeze cylinder is used having a closed end and an open end. Around the cylinder adjacent the closed end a brushless DC stator is placed. The stator is connected to a DC power supply (or inverter). An evaporator is coiled around substantially the remainder of the exterior of the cylinder and connected to a mechanical refrigeration system. A spacer plate holds a bearing centrally thereof and is retained within the cylinder against the closed end thereof. A rotor is positioned in the cylinder adjacent the spacer plate. The rotor consists of metal ring around the perimeter of which are secured eight permanent magnets. The magnets are equidistantly spaced and alternate as to their polarity. The magnets and disk are encased in a food grade plastic creating a rotor disk having a central hole. A scraper extends along the axis of the cylinder and includes a central rod end that extends through the rotor and into the bearing of the spacer disk. The scraper includes a skirt portion around the rod end for securing to the rotor. The open end of the cylinder is sealed in the conventional manner with a plate which includes a valve for dispensing beverage from the interior volume of the cylinder and a rotative support for the opposite end of the scraper central rod. A delivery line provides for delivery of the beverage from a source thereof into the cylinder through a beverage inlet fitting.

In operation, it can be understood that the stator and rotor constitute a brushless DC three phase motor that is operated by the power supply to rotate the scraper within the cylinder. Those of skill will readily appreciate that no dynamic seal is needed as no rod end of the scraper is required to extend out of the cylinder for mechanical connection to a drive motor. In addition, prior art machines require a gear case between the actual drive motor and the scraper rod. This mechanism is also eliminated by the present invention. Accordingly, the present invention provides for a machine that requires less in the way of service calls and that is thereby less expensive to operate. Encasing the rotor in a food grade plastic permits that portion of the motor to reside within the cylinder thereby making the motor an integral part of the cylinder.

In a further embodiment of the present invention, a freeze cylinder is used that also has a closed end and an open end. A conventional motor and gear drive are used, however the gear drive is adapted to rotate a circular magnetic drive plate. The plate includes a plurality of permanent magnets of alternating polarity secured on one surface thereof in a circular arrangement. This external magnetic drive plate is positioned so that the magnetic surface thereof faces and is closely adjacent the exterior surface of the cylinder closed end. Within the cylinder a similar circular magnetic ring is rotatively mounted therein within an annular groove of a stainless steel disk. This internal disk is secured to a rod end of a scraper and the magnetic face of the magnetic ring faces the internal surface of the cylinder end and is positioned closely adjacent thereto. A round plastic collar is secured over the annular groove for sealing the magnetic ring therein.

In operation, the motor is used to rotate the external magnetic drive plate. The external drive plate is magnetically coupled to the magnetic ring of the internal driven disk wherein rotation is imparted to the scraper. Thus, this embodiment of the present invention provides for a magnetic drive of the scraper wherein no dynamic seal is required. The internal magnetic ring is sealed from contact with the food product by the food compatible stainless steel and plastic collar, thereby permitting the use of that essential magnetic drive component within the cylinder.

DESCRIPTION OF THE DRAWINGS:

A better and further understanding of the structure, function and the objects and advantages of the present invention can be had by reference to the following detailed description which refers to the following figures, wherein:

FIG. 3 shows a plan view of the frozen food product cylinder assembly including the first drive mechanism of the present invention.

FIG. 4 shows a cross-sectional view along lines 4—4 of FIG. 3.

FIG. 7 shows a cross-sectional view of a frozen food product cylinder assembly including a second drive mechanism of the present invention.

FIG. 8 shows a surface plan view of a magnetic drive disk of the present invention.

FIG. 9 shows a cross-sectional view along lines 9—9 of FIG. 7

FIG. 26 shows a flow diagram of the expansion valve control logic

Figure 1:
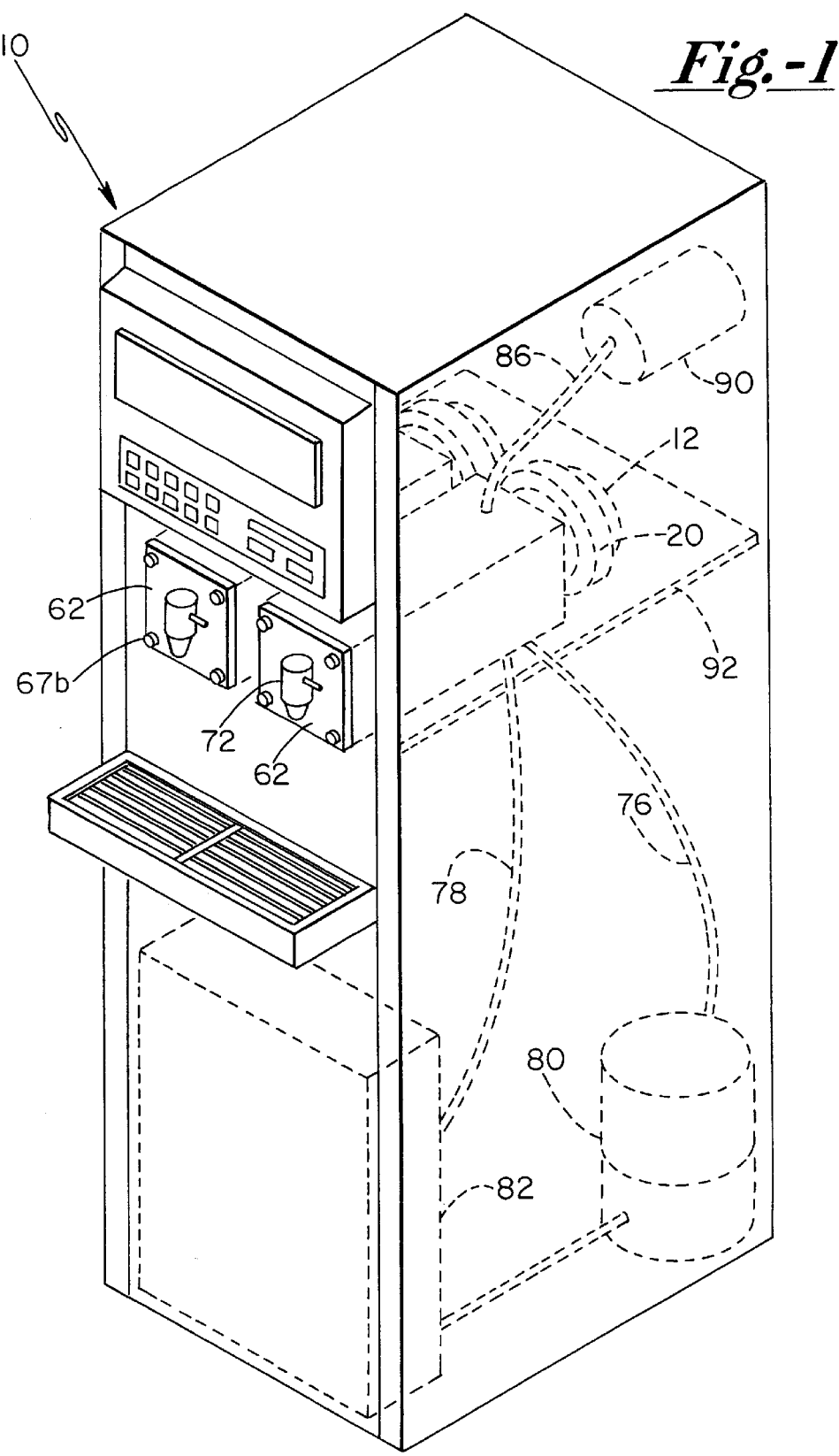
FIG. 1 shows a perspective view of a frozen food product dispensing machine.
Figure 2:
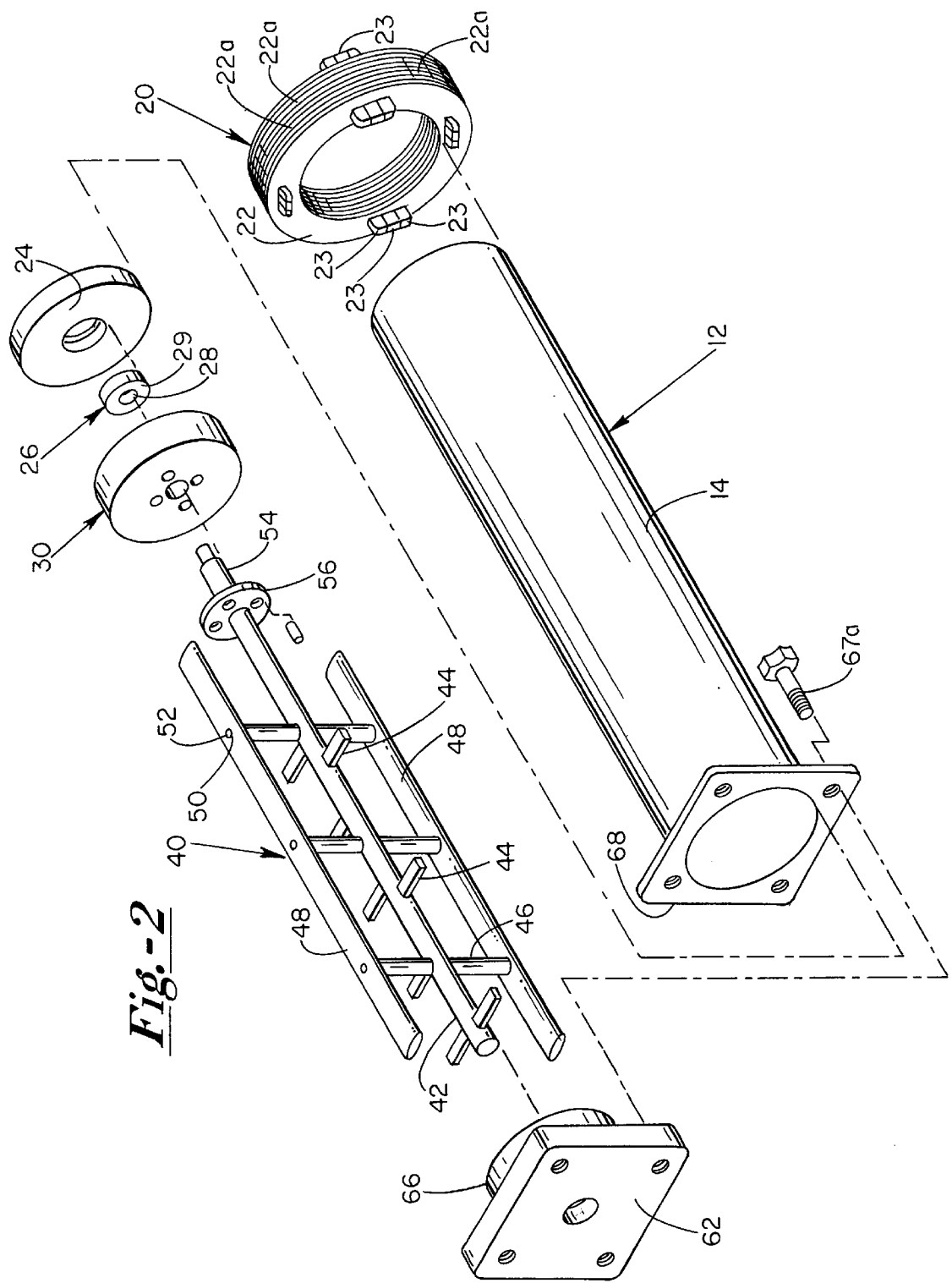
FIG. 2 shows an exploded view of a frozen food product cylinder assembly in conjunction with a first drive mechanism of the present invention.

DETAILED DESCRIPTION OF THE PREFERRED EMBODIMENT:

A frozen food product making and dispensing machine is seen in FIG. 1, and generally referred to by the number 10. Machine 10 is illustrative of the type wherein the present invention can be applied. As seen by also referring to FIGS. 2–4, a stainless steel cylinder 12 includes a cylindrical wall 14 and a stainless steel plate 16 welded to one end thereof forming a closed end surface and defining a cylinder interior 18. A three phase stator 20 includes a ring portion 22 made of multiple lamination layers 22a to which three electrical windings 23 are wound and braided there around. Stator 20 is positioned on the end of cylinder 12 adjacent end wall 16 with cylinder wall 14 extending through the center thereof.

Figure 5:
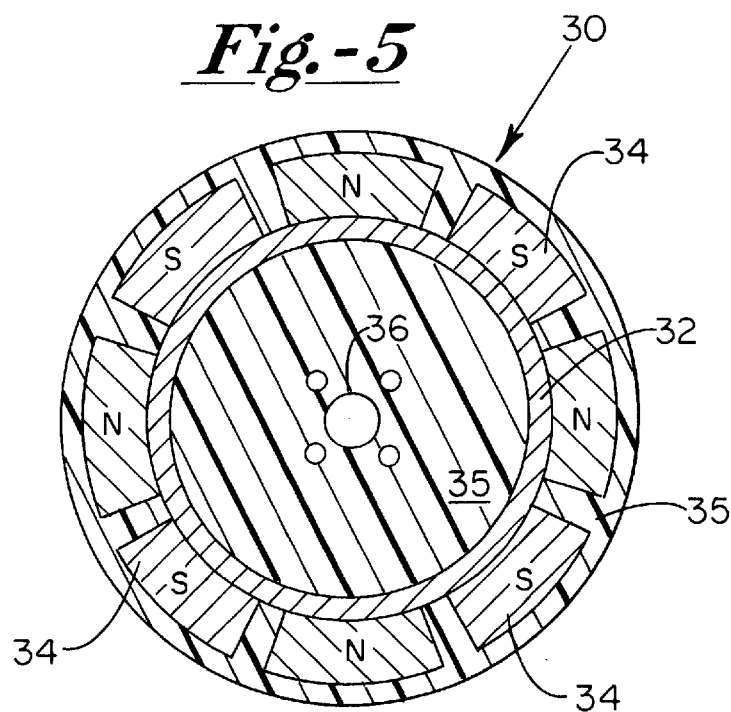
FIG. 5 shows a cross-sectional view along lines 5—5 of FIG. 2.

A plastic spacer disk 24 is located within cylinder 12 and is positioned against end wall 16. Disk 24 is made of a suitable food grade plastic and includes a bearing 26 mounted centrally thereof. As understood by also referring to FIG. 5, a rotor 30 includes a metal tube ring section 32 having eight permanent magnets 34 secured equidistantly around a perimeter thereof wherein the North and South polarities thereof alternate. Ring 32 and magnets 34 are encased in a food grade plastic 35, such as Delrin®, molded there around and leaving a central shaft hole 36.

A scraper mechanism 40, also made of a suitable food grade plastic, includes a central shaft 42 having a plurality of mixing rods 44 and scraper blade supports 46 extending therefrom. A pair of scraper blades 48 are mounted on supports 46 wherein holes 50 thereof receive pin portions 52 of supports 46. Shaft end portion 54 extends through hole 36 and is received in hole 28 of bearing 26. Shaft 42 also includes an attachment skirt 56 for securing thereof to rotor disk 30. An opposite end 58 of shaft 42 is received in a short support section 60 integral with extending from a plastic end cover 62. Cover 62 includes an o-ring 64 extending around a cylinder inserting portion 66 thereof. Cover 62 is secured to cylinder 12 by a plurality of bolts 67a and nuts 67b. Flange 68, as with plate 16, is also made of stainless steel and welded to cylinder 12. As is known in the art, cover 62 includes a hole 70 for receiving a dispensing valve 72.

As is understood by those of skill, an evaporator coil 74 extends around the exterior of cylinder 12 and includes an inlet fitting 74a and an outlet fitting 74b. Fittings 74a and 74b are connected to high pressure line 76 and low pressure line 78 respectively of a mechanical refrigeration system including a compressor 80 and a condenser 82. Insulation 84 extends around cylinder 12 and evaporator 74. A beverage inlet line 86 is connected to a cylinder inlet fitting 88 and a beverage reservoir or mixing tank 90. A pair of cylinders 12 can be secured within the housing of dispenser 10 and supported therein by a framework 92 thereof.

Figure 6:
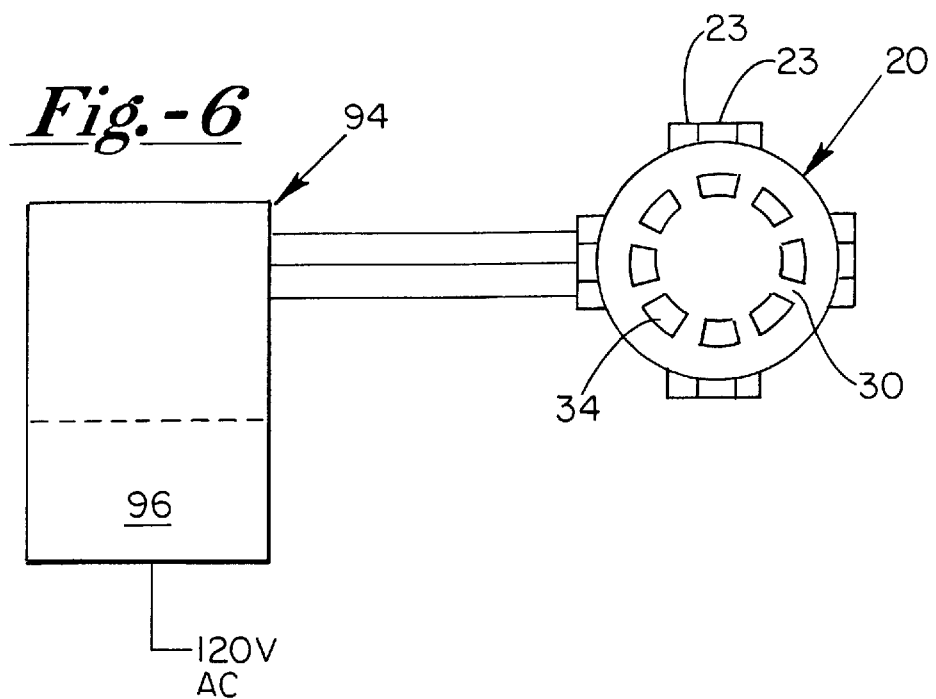
FIG. 6 shows an electrical schematic for the first drive mechanism.
Figure 10:
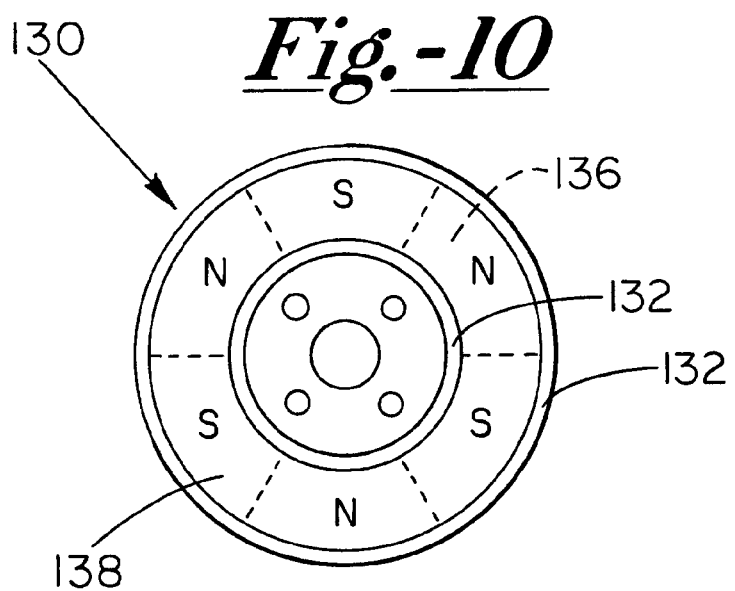
FIG. 10 shows a perspective view of a frozen food product dispensing machine.
Figure 11:
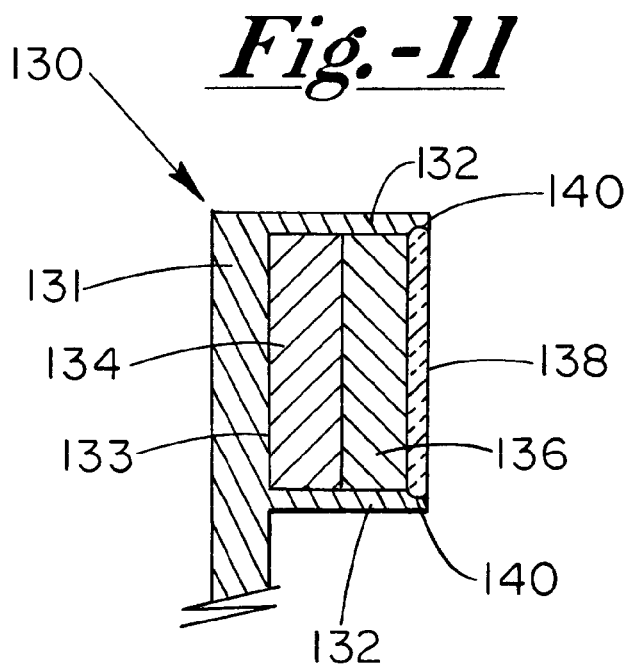
FIG. 11 shows an enlarged cross-sectional view of the driven disk.

As seen in the schematic of FIG. 6, a power supply 94 includes an inverter 96 for converting 220VAC to a three phase DC current. This three phase current is connected to the three winding 23 of stator 20. Thus, those of skill will understand that stator 20 and rotor 30 comprise a DC motor. In operation, therefore, the three phase current induces movement of rotor 30 which, in turn, rotates scraper mechanism or assembly 40. Thus, with a beverage, for example, delivered within cylinder 12 through line 86 and cooling thereof by evaporator 74 and its associated refrigeration system, frozen beverage can be produced by scraping thereof from the interior surface of cylinder 12. The use of a rotor around which a food grade plastic has been molded permits that part of the DC drive motor to be internal of the cylinder and in contact with the food product. In general, all the components of the present invention are made of or coated with a suitable food grade material. Thus, the present invention comprises a drive mechanism for a frozen food product machine utilizing an internally scraped cylinder wherein the drive motor therefore is an integral part of the cylinder assembly. As a result, no dynamic seal or external shaft bearing is needed for the scraper mechanism. Thus, the traditional external motor, dynamic seal, external shaft bearing and transmission can be eliminated.

In one example of the integral DC motor drive embodiment of the present invention, the drive motor is used in a cylinder that is approximately 15 inches long with a diameter of approximately 4.5 inches. The drive motor in such an application is designed to produce a torque of approximately 110 inch/lbs. at 100 RPM's.

In a second embodiment of the present invention, as seen in FIGS. 7–9, a cylinder 100 has a cylinder wall 102 and an end plate 104 defining a cylinder end surface 106. An AC motor 108 is secured to a transmission 110 which is in turn secured to a plastic collar 112 attached to plate 104. Transmission 110 includes a drive shaft 114 to which is attached a magnetic drive disk 116. As seen in FIG. 8, disk 116 includes six permanent magnets 118 secured thereto around a perimeter of one side or face thereof wherein the North and South polarities thereof alternate. Magnets 118 are positioned to face and be held closely adjacent end surface 106.

Within cylinder 100 a food grade plastic spacer 120 is positioned against the interior surface of end wall 106. Spacer 120 includes a central bearing 122 and includes an annular wall portion 124 defining a disk retaining space 126. A food grade plastic collar 128 is received in stainless steel bearing 122 and on one end thereof has a driven magnetic disk 130 secured thereto. As seen by also referring to FIG. , a stainless steel disk 130 includes a plurality of permanent magnets 131 arranged on a metal ring 132. Ring 132 is secured to disk 130 within an annular groove 134 thereof as defined by walls 135. A plastic collar or ring cover ring 136 is secured to walls 135 around a top perimeter thereof for sealably enclosing magnets 131 and ring 132 within annular groove 134. Magnets 131 of disk 130 are positioned to face and lie closely adjacent the interior surface of end wall 106.

As with the first drive embodiment described above, the second drive embodiment also includes a scraper mechanism 40 having a central shaft 42 having a plurality of mixing rods 44 and scraper blade supports 46 extending therefrom. A pair of scraper blades 48 are mounted on supports 46 wherein holes 50 thereof receive pin portions 52 of supports 46. A shaft end portion 140 is shaped as seen in FIG. 9, to provide for driving receiving thereof in a similarly shaped bore 142 of collar 128. As with the previously described embodiment, an opposite end 144 of shaft 42 is received in support 60 extending from plastic end cover 62. Flange 68, as with plate 104, is also made of stainless steel and welded to cylinder 100.

As with the previously described DC motor embodiment, cylinder 100 includes an evaporator coil 74 extending there around that includes an inlet fitting 74*a*, an outlet fitting 74*b* and a food product/beverage inlet 88 for connection as stated above. Insulation 84 also extends around cylinder 100 and evaporator 74. A pair of cylinders 100 can be secured within the housing of dispenser 10 and supported therein by a framework 92 thereof.

In operation, motor 108 operates through transmission 110 to rotate magnetic disk 116. Due to the magnetic coupling between disk 116 and 130 as they face each other on opposite sides of end wall 106, rotation of disk 116 results in the rotation of disk 130, and hence, rotation of scraper mechanism or assembly 40. Thus, with beverage or food product delivered within cylinder 100 through line 86 and cooling thereof by evaporator 74 and its associated refrigeration system, frozen beverage can be produced by scraping thereof from the interior surface of cylinder 100. This magnetic drive embodiment, as with the DC motor embodiment herein, eliminates the need for a dynamic seal and an external bearing with respect to the shaft 42 of the scraper mechanism 40. Also, plate having an annular groove for receiving the magnets and ring wherein those components are sealed therein by a food grade plastic ring, permit the driven disk 130 to be in contact with food product, i.e. permits a magnetic drive approach or mechanism that is food, compatible.

Figure 12:
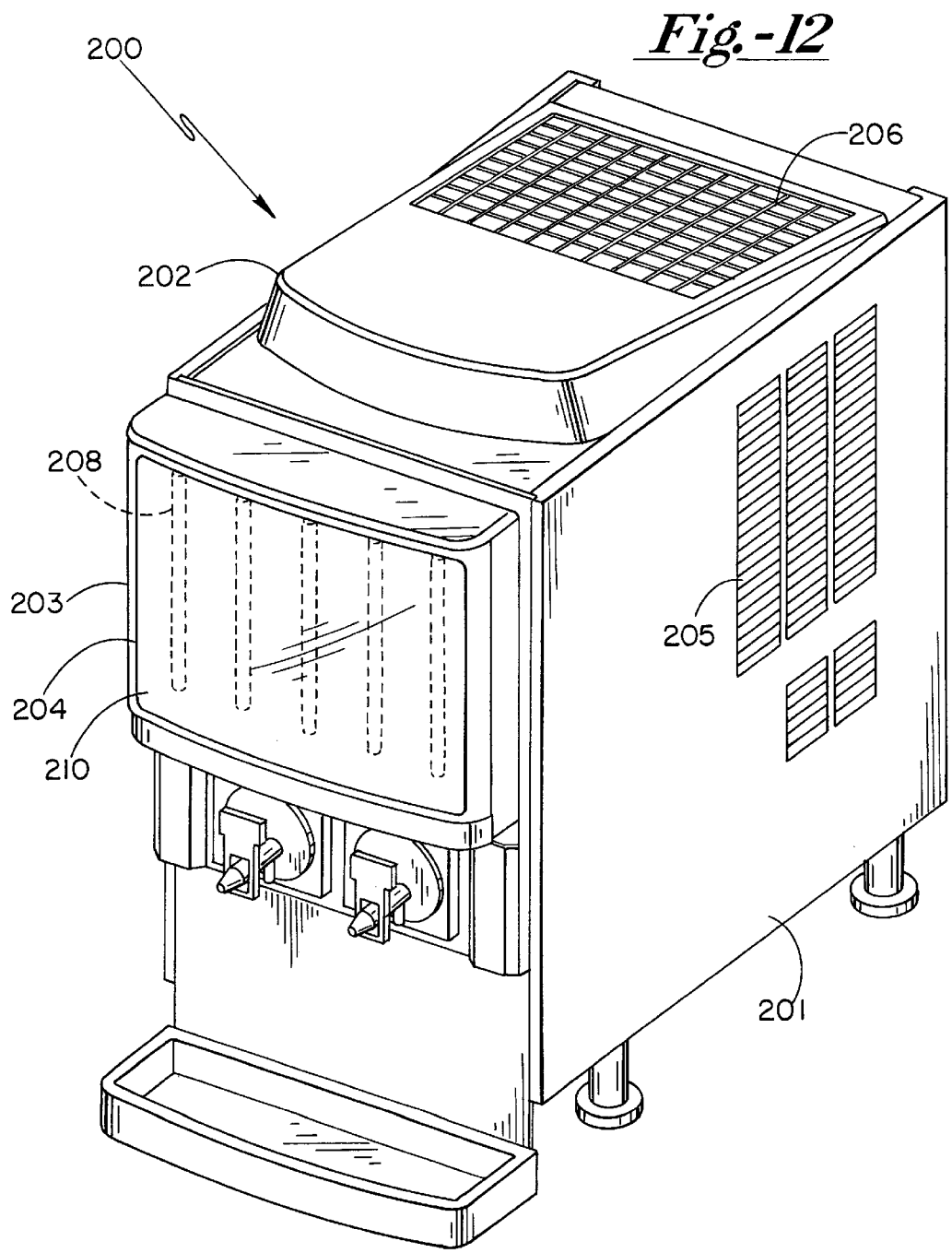
FIG. 12 shows a perspective view of the present invention.
Figure 13:
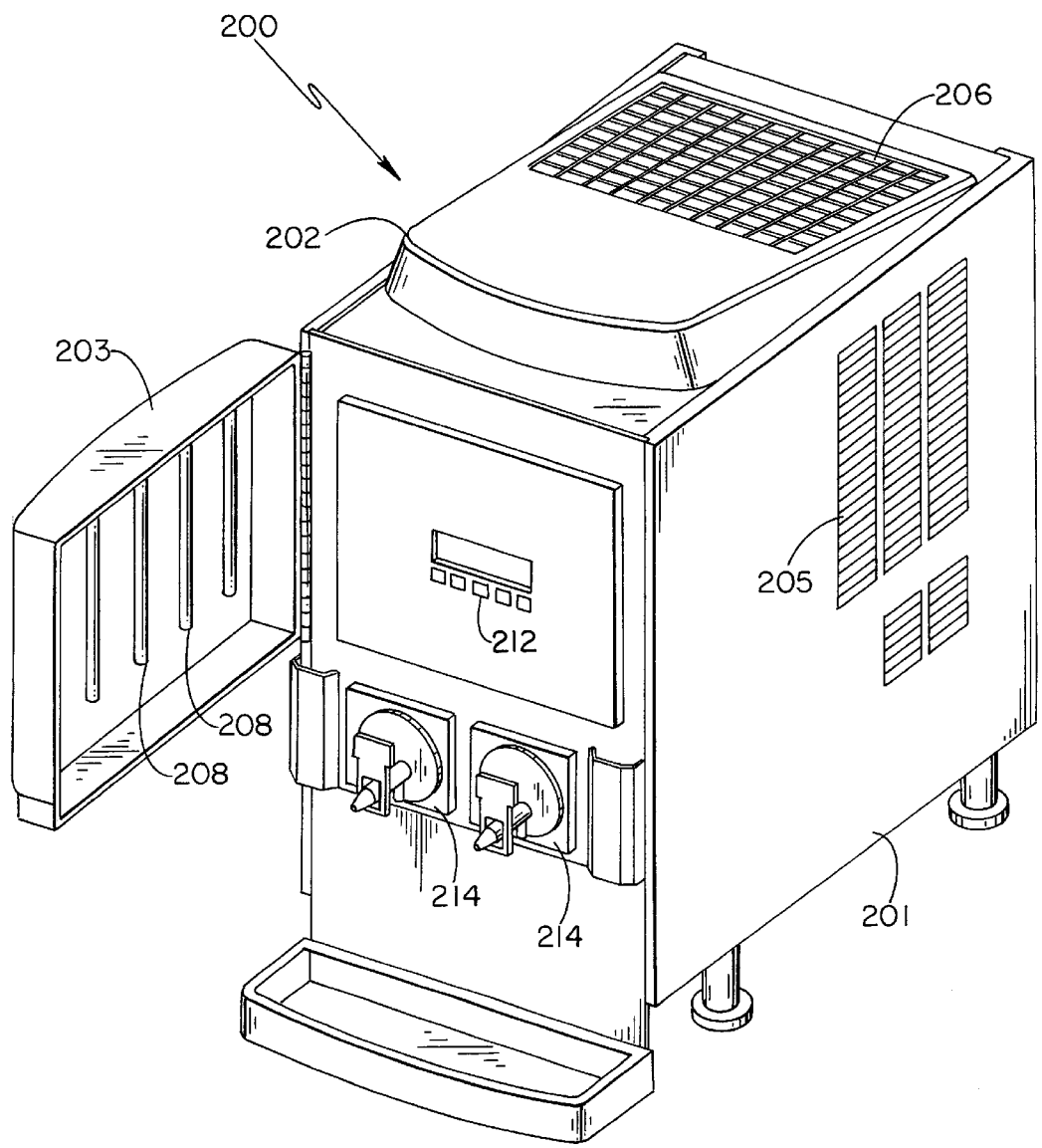
FIG. 13 shows a further perspective view of the present invention.

A further embodiment of the present invention is seen in FIGS. 12 and 13 and generally referred to by the numeral 200. Machine 200 has an outer housing having removable panels, including side panels 201, a top panel 202 and a display door 203 having a transparency window 204. Panels 201 and 202 include louvers 205 and an air flow grate 206, respectively. A plurality of light fixtures 208 are secured door 203, and are used for back lighting a transparency 210. Door 203 is hinged to a front surface of machine 200, and as seen in FIG. 13, can be swung to an open position for facilitating access to fixtures 208 and to user interface 212.

Figure 14:
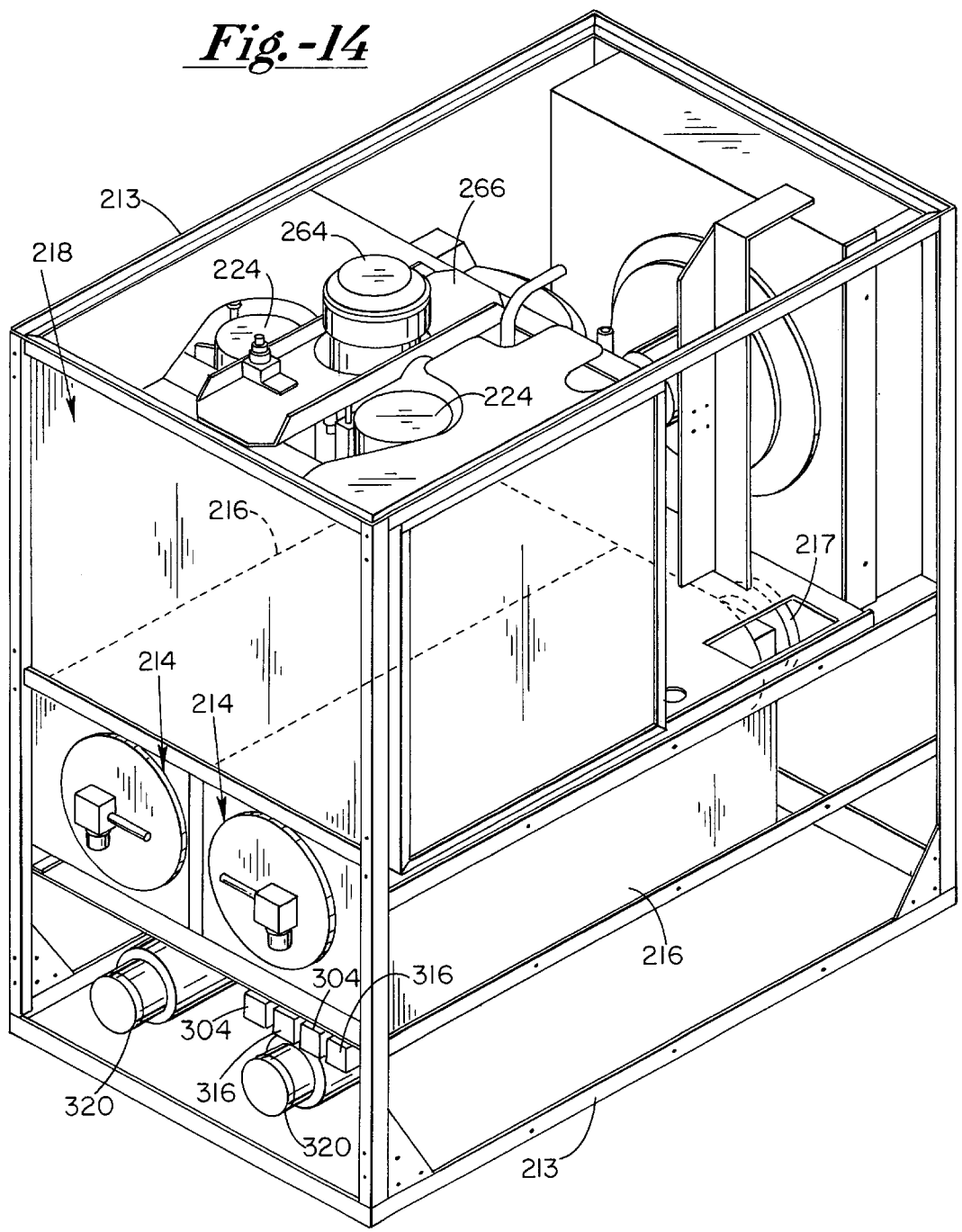
FIG. 14 shows a perspective view of the present invention having the panels removed therefrom.
Figure 15:
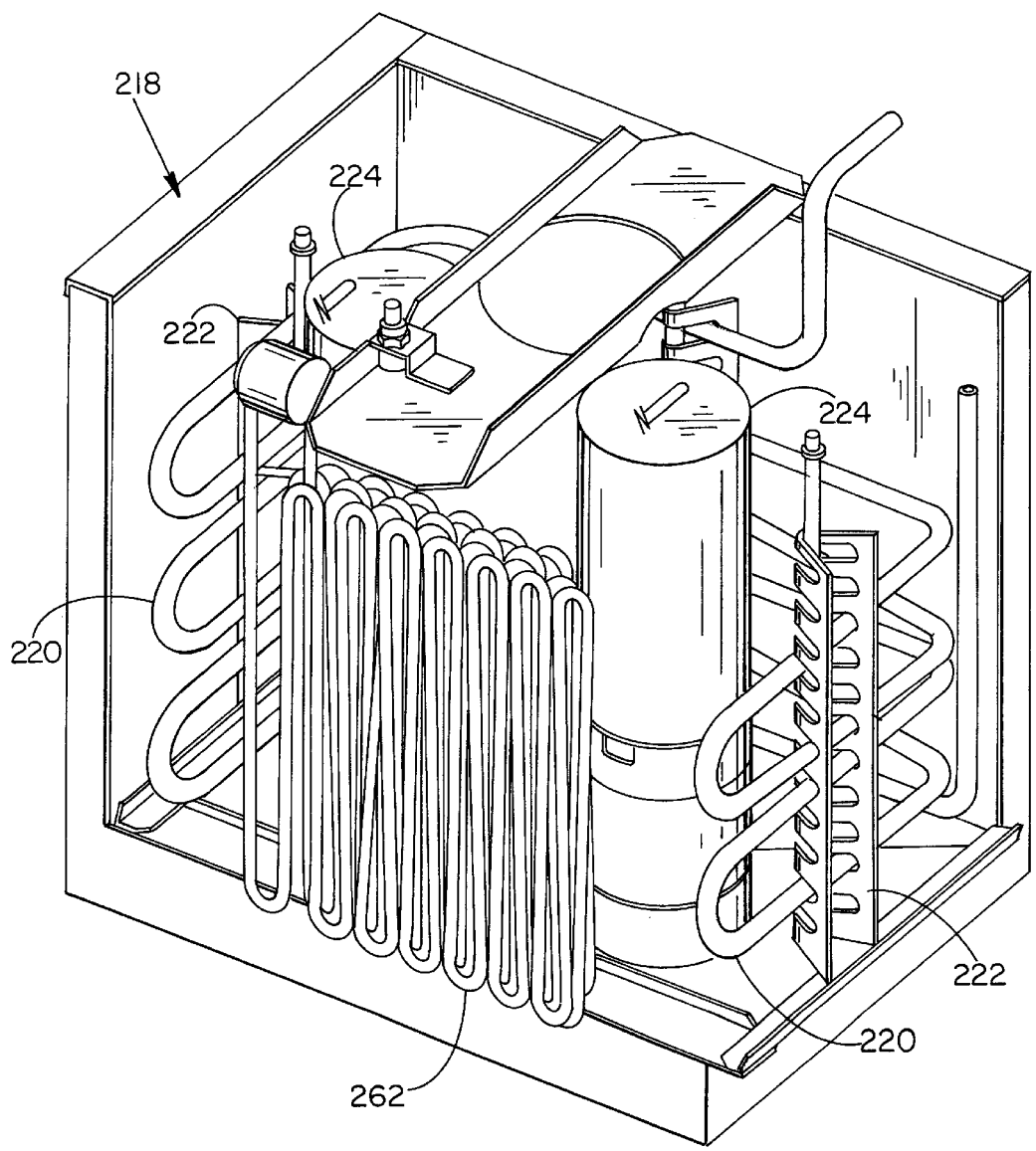
FIG. 15 shows a partial cut away view of the water bath tank.

As seen by also referring to FIG. 14, machine 200 includes a framework 213 for supporting various internal components as well as the various portions of the exterior housing including housing panels 201 and 202, and access door 203. A pair of freeze cylinder assemblies 214 are held within separate insulated housings 216. Both cylinder assemblies 214 are of the type disclosed above in FIGS. 2–6 herein and have DC drive motors 217 as also shown and described therein. However, unlike dispenser 10, embodiment 200 includes a water bath tank 218. Tank 218 includes sides 219 for retaining a volume of water therein. As seen by also referring to FIG. 15, tank 218 includes an ice bank forming evaporator 220. Evaporator 220 is held therein by support means 222 and positioned thereby adjacent three of the four interior surfaces of sides 219.

Figure 16:
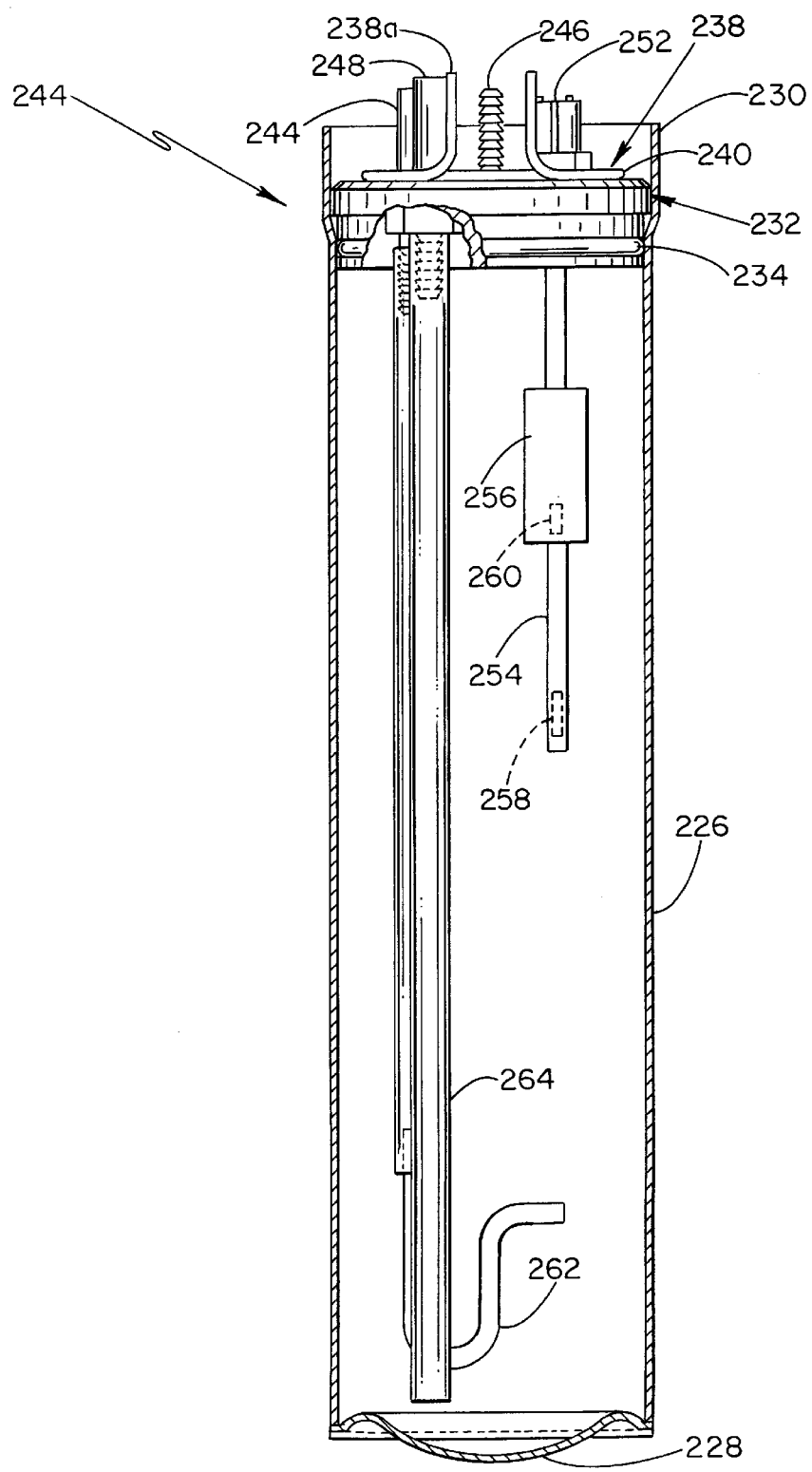
FIG. 16 shows a cross-sectional plan view of a carbonator/blending bottle.
Figure 17:
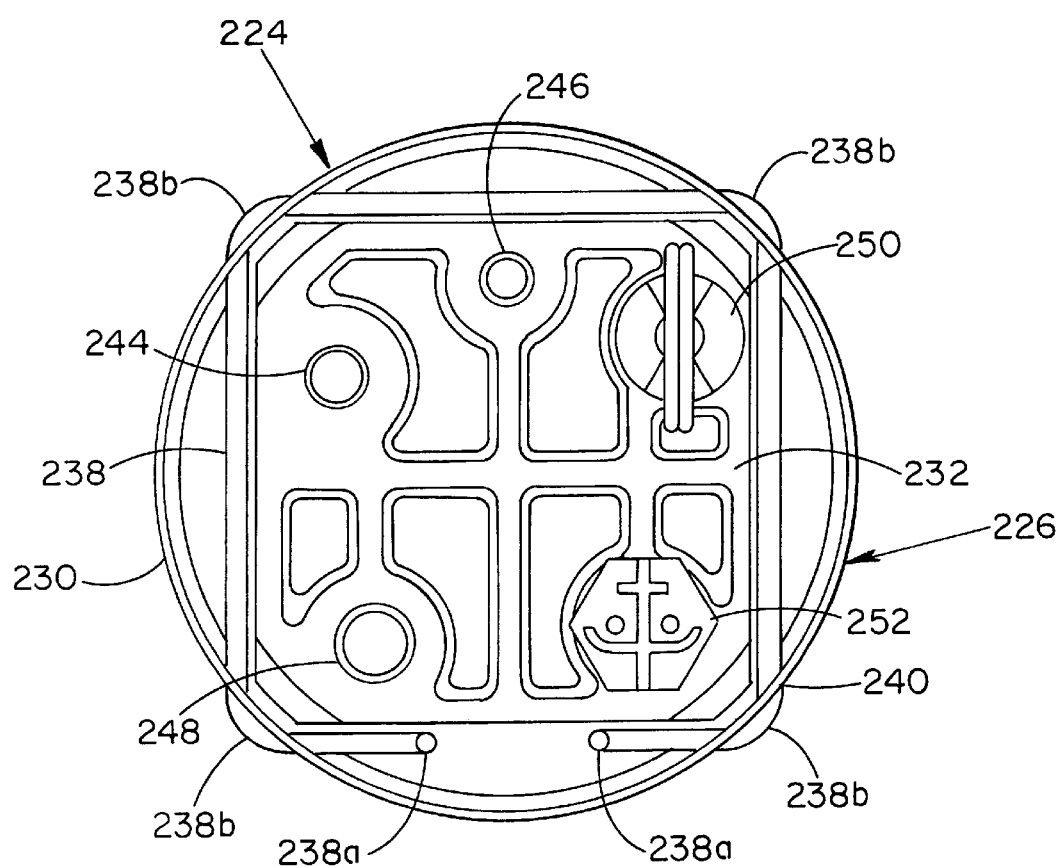
FIG. 17 shows a top plan view of the a carbonator/blending bottle.

A pair of specialized carbonator/blender bottles 224 are retained in tank 218. Bottles 224 are seen in greater detail in FIGS. 16 and 17 and are essentially the same as the carbonator disclosed in co-pending U.S. patent application Ser. No. 08/761,191, filed Dec. 5, 1996, which application is incorporated herein by reference thereto. Bottles 224 each include a cylindrical stainless steel body 226 having a bottom end 228 and a top open end 230. A plastic disk 232 is sized to fit within open end 230 and sealed there against by an o-ring 234. Disk 232 is releasably retained in open end 230 by means of a wire spring or clip 238. Clip 238 can be grasped by ends 238a thereof to remove from or insert into slots 240, cut through cylinder 226, through which radiussed corners 238*b* are inserted. Disk top surface 242 is designed to cooperate with clip 238 to minimize any accidental disengagement thereof with disk 232. In addition, disk 232 includes a fluid inlet 244, a gas inlet 246 for receiving pressurized carbon dioxide gas and a fluid outlet 248. Disk 232 also includes a safety release pressure valve 250 and a liquid level sensor 252. Sensor 252 includes a rod 254 that is positioned within bottle 224 having a movable float 256 free to slide there along. Rod 254 includes one or more magnetically actuated switches 258 therein and along the length thereof, and float 256 includes a magnet 260. As is understood in the art sensor 252 operates whereby float 256 is carried by the level of liquid within 224. As magnet 258 moves adjacent one of the switches 258 turning it on, then a level can be indicated. Inlet 244 is fluidly connected to a J-tube 262, and outlet 248 is fluidly connected to a tube 264 extending to a point adjacent bottle end 228.

Water bath tank 218 also includes a two serpentine coils of heat exchange stainless steel tubing 262 positioned together and adjacent a fourth or remaining interior surface side against which evaporator 220 is not positioned. An agitator motor 264 is secured to a top cover panel 266 and includes a shaft and attached agitator blade, not shown, for agitating the water within bath 218.

Figure 18:
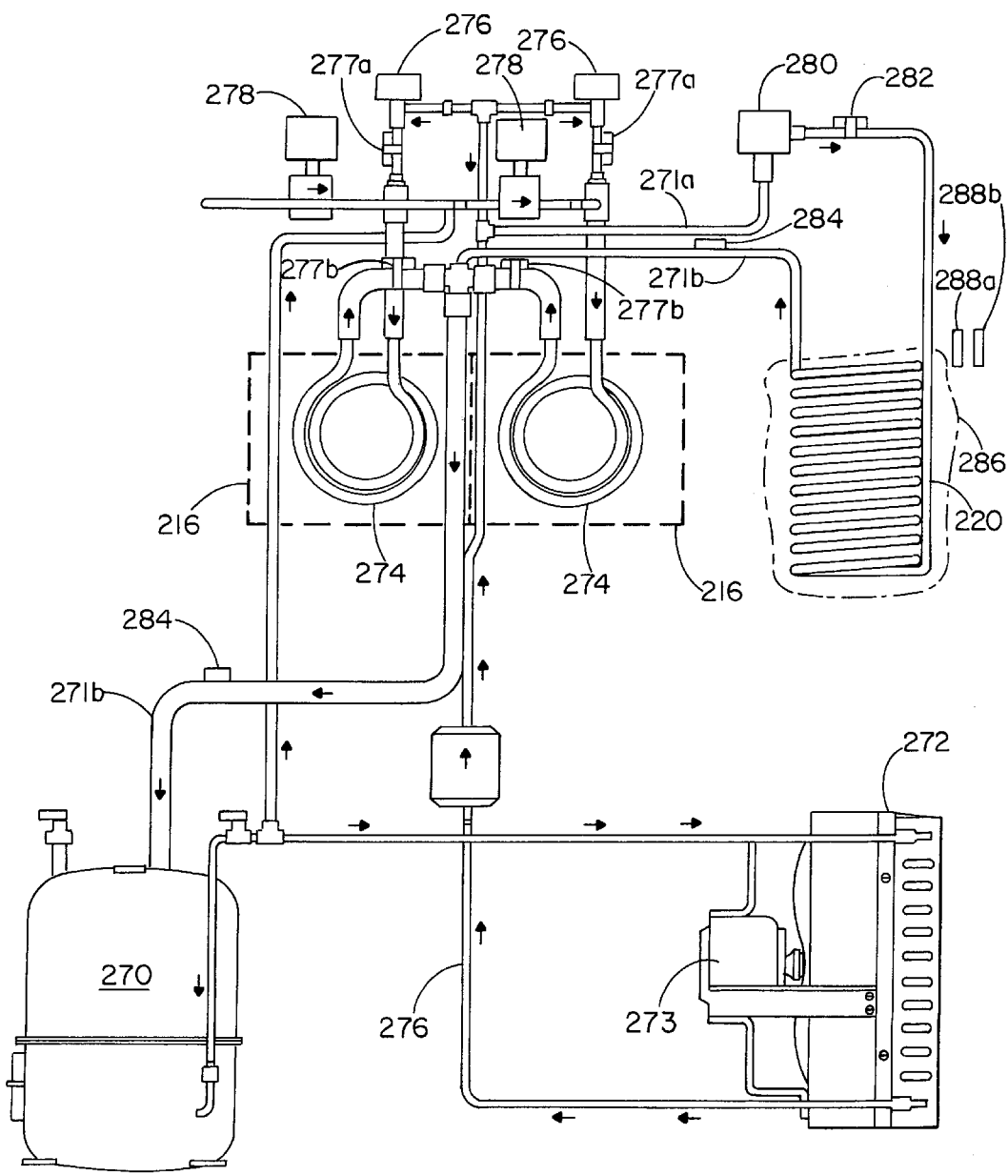
FIG. 18 shows a schematic diagram of the refrigeration system.

As understood by also referring to FIG. 18, the refrigeration system used in machine 200 includes a refrigeration compressor 270 connected by refrigerant high pressure and low pressure lines 271*a* and 271*b*, respectively, to a condenser 272. Each cylinder assembly 214 includes an evaporator coil 274 and each evaporator coil has associated there with an electronically pulsed expansion valve 276 and a hot gas defrost valve 278. Also, each coil 276 includes an inlet temperature sensor 277*a* and an outlet temperature sensor 277*b*. The ice bank forming evaporator 220 is also connected to compressor 270 by high and low pressure lines 271*a* and 271*b*. Evaporator 220 also has refrigerant metered therein by an electronically pulsed expansion valve 280. Evaporator 220 also includes an inlet temperature sensor 282 and an outlet temperature sensor 284.

Figure 21:
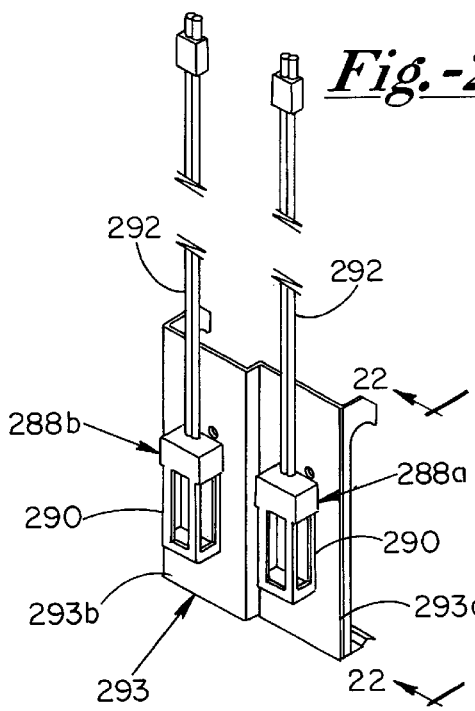
FIG. 21 shows a perspective view of the dual ice bank control sensor.
Figure 22:
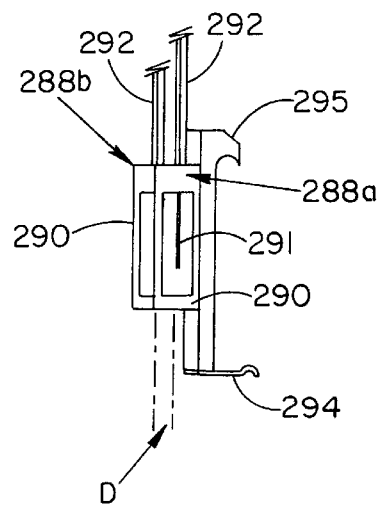
FIG. 22 shows a end plan view along lines 21—21 of FIG. 20.

An ice bank 286 forms on evaporator 220 and, as further understood by referring to FIGS. 21 and 22, the size thereof is regulated by a pair of ice bank sensors 288*a* and 288*b*. Sensors 288*a* and 288*b* each include a housing 290 wherein a pair of wire probes 291 extend. Probes 291 are connected to wires 292 that provide connection to the control of the present invention, further described below. Each housing 290 is secured to an attachment plate 293. Sensor 288*a* is secured to a first level surface 293*a* of plate 293 and sensor 288*b* is secured to a second outer level surface 293*b* thereof. Thus, a differential distance D, as indicated by the dashed lines of FIG. 21, is created between the probes 291 of each of the sensors 288*a* and 288*b*. A flange 294 and hook 295 provide for attachment of plate 293 to a suitable support means within ice bath 218 at a suitable distance from evaporator 220.

Figure 19:
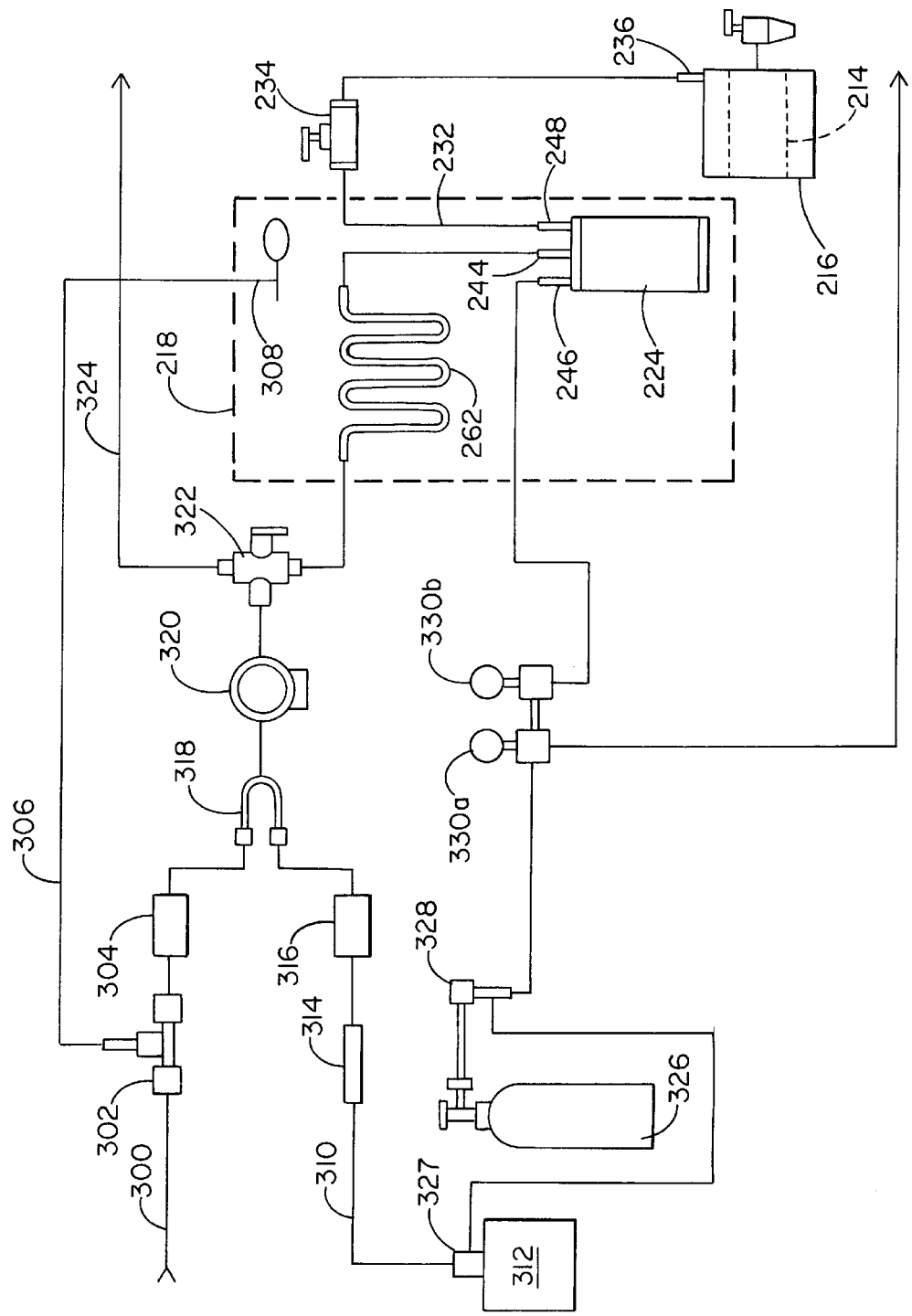
FIG. 19 shows a schematic diagram of the fluid beverage system.

A schematic of the beverage fluid delivering system used in the present invention can be understood by referring to FIG. 19. A seen therein, an inlet water line 300 is connected to a source of potable water for delivering the water, first to a T-fitting 302 and then to a brixing or ratioing valve 304. A second line 306 extends from fitting 302 to a float operated valve 308 positioned within water bath tank 218. A third line 310 is connected to a source of beverage syrup, such as a bag-in-box 312. Line 310 includes a fluid flow sensor 314 and is fluidly connected to a further brixing valve 316. Sensor 314 is of the piston fluid contact type as, for example, model FS-3, as manufactured by Gems Sensors, of Plainville, Conn. Valves 304 and 316 provide for mixing the water and syrup at a ratio of typically 5 to 1 respectively. The fluid components flow to a Y-fitting 318 and are mixed together. A pump 320 pumps the properly ratioed, but as yet noncarbonated beverage, to a test valve 322 and from there to one of the heat exchange serpentine coils located in tank 218. Valve 322 normally directs the beverage to a coil 262, but can be manually operated to divert and deliver a test sample of the beverage along line 324 to an outlet point. In this manner the beverage can be easily tested to check for the proper ratioing thereof by valves 304 and 316. The beverage flows from a coil 262 to inlet 244 of the associated blender/carbonator bottle 224. A pressurized source of carbon dioxide gas 326 provides carbon dioxide first to a valve 328. Valve 328 provides for diverting carbon dioxide gas to bag-in-box 312 in the example where a carbon dioxide pump 327 is used to move syrup therefrom. Those of skill will realize that other means, such as electric pumps can be used to pump the syrup whereby valve 328 would not be required. Or, carbon dioxide gas can be used to propel the syrup from a rigid stainless syrup tank. Regulator valves 330a and 330b provide the carbon dioxide at a desired pressure to the gas inlets 246 of each blender/carbonator 224 positioned in tank 218. It will be appreciated that FIG. 18 shows a schematic of one of the beverage fluid systems, there being one for each cylinder assembly 214. Thus, in a machine 200 having two cylinders 214, there are two brixing valves 304, two brixing valves 316, two coils 262, two pumps 320, two flow sensors 314, and two carbonator/blenders 224. The outlets of each blender/carbonator 224 are connected to outlet lines 332 that are connected first to manual valves 234 and then to inlets 236 of each of the cylinders 214. Valves 234 provide for manually stopping the flow of carbonated beverage to cylinders 214, primarily for the purpose of facilitating servicing thereof.

Sensors 314 provide a major advantage in that they are able to sense when the syrup has run out whether the syrup is delivered from a bag-in-box or from a stainless tank. Prior art machines required that there be two sensor systems, one for either syrup containing source. A pressure sensor was required for the bag-in-box as, when the bag became empty, there would be no pressure, and that would indicate a sold out condition. However, if a tank was used the carbon dioxide gas used to propel the syrup would indicate to the pressure sensor that syrup was present, when in fact, it was not. Thus, a tank syrup reservoir required a float sensor that would only be affected by actual liquid syrup. Therefore, sensor 314 eliminates having redundant systems and the associated cost and complexity thereof.

It can be appreciated that the present invention provides for the cooling of a volume of beverage within coils 262 prior to introduction thereof into each blender/carbonator 224. Thus, the beverage will have reached a temperature of approximately 36 degrees Fahrenheit prior to the introduction thereof into a corresponding container 224. In addition, each blender/carbonator is also held at the same temperature being immersed in the cold water bath. Therefore, the carbonation of the beverage that occurs therein can reach a desired level of saturation at much lower carbon dioxide gas pressures than if the mixing were occurring in a bottle held at a much warmer room ambient temperature. In addition, the present invention has a much greater beverage production capacity, as an ice bank presents a large cooling reserve that would otherwise not be available unless an exceedingly large refrigeration system is used. Thus, as the beverage is presented to the freeze cylinder at a very low temperature, the cooling required of the freeze cylinder evaporators is much lower so that overall, the present invention works much more efficiently than do comparable prior art machines that produce semi-frozen beverages or food products from beverage delivered to the cylinders at ambient temperatures.

Figure 20:
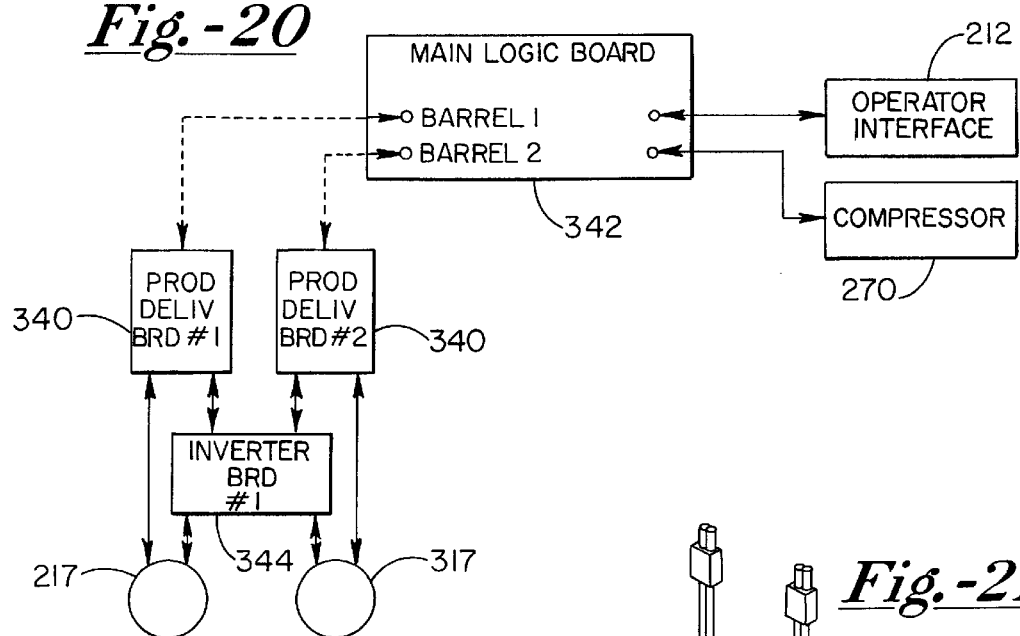
FIG. 20 shows a schematic diagram of the electronic control.

As seen in FIG. 20, the present invention uses a distributed electronic control having a product delivery control board 340 for the control of each cylinder 214. A main logic board 342 is connected to each control board 340, and there is one inverter board 344 for each of the two cylinders 214. The boards communicate as is generally indicated by the arrows of FIG. 20. Main board 342 receives inputs from the user interface 212, and from each of the product delivery boards (340) on the system, as well from a $CO_2$ pressure sensor, an $H_2O$ pressure sensor, high/low line voltage sensor, not shown, ice bank thickness (min) 288a, ice bank thickness (max.) 288b, ice bank evaporator input temperature 282 and ice bank evaporator output temperature 284. Main board 342 controls the operation of compressor 27- on/off, ice bank agitator motor 264 and ice bank pulse valve 280. Each product delivery board 340 receives inputs from its associated syrup flow sensor 314, level sensor 252, evaporator input temperature sensor 277a, evaporator output temperature sensor 277b, product viscosity sensor and DC drive motor error, and controls the operation of its associated DC drive motor on/off, defrost valve 278 on/off, pulse valve 276 on/off, syrup valve on/off, $H_2O$ valve, on/off, disp. valve lockout, product status light, not shown and blendonator pump 320. The inverter board 344 provides for inverting the 240VAC supplied current to the 340VDC current used by motors 217. In addition, it senses the current draw being placed on each motor 217 and runs them at a constant 120 revolutions per minute (RPM).

A distributed control is used to better accommodate machines having more than two cylinders 214. Thus, the main board 342 can be designed to work with more than two product delivery boards. In this manner, a cost saving can be had as opposed to having a main control board having to be designed specifically for each machine having a particular number of cylinders. The main board receives the commands from the operator interface, and distributes this information to the appropriate board. For instance, if the operator wants to turn on cylinder #1, the main board will send the "on" command to the product delivery board on cylinder #1. The PDB will then tell the inverter board to apply power to stator #1, as well as request the compressor to come on and begin pulsing the pulse valve for cylinder #1.

Figure 23:
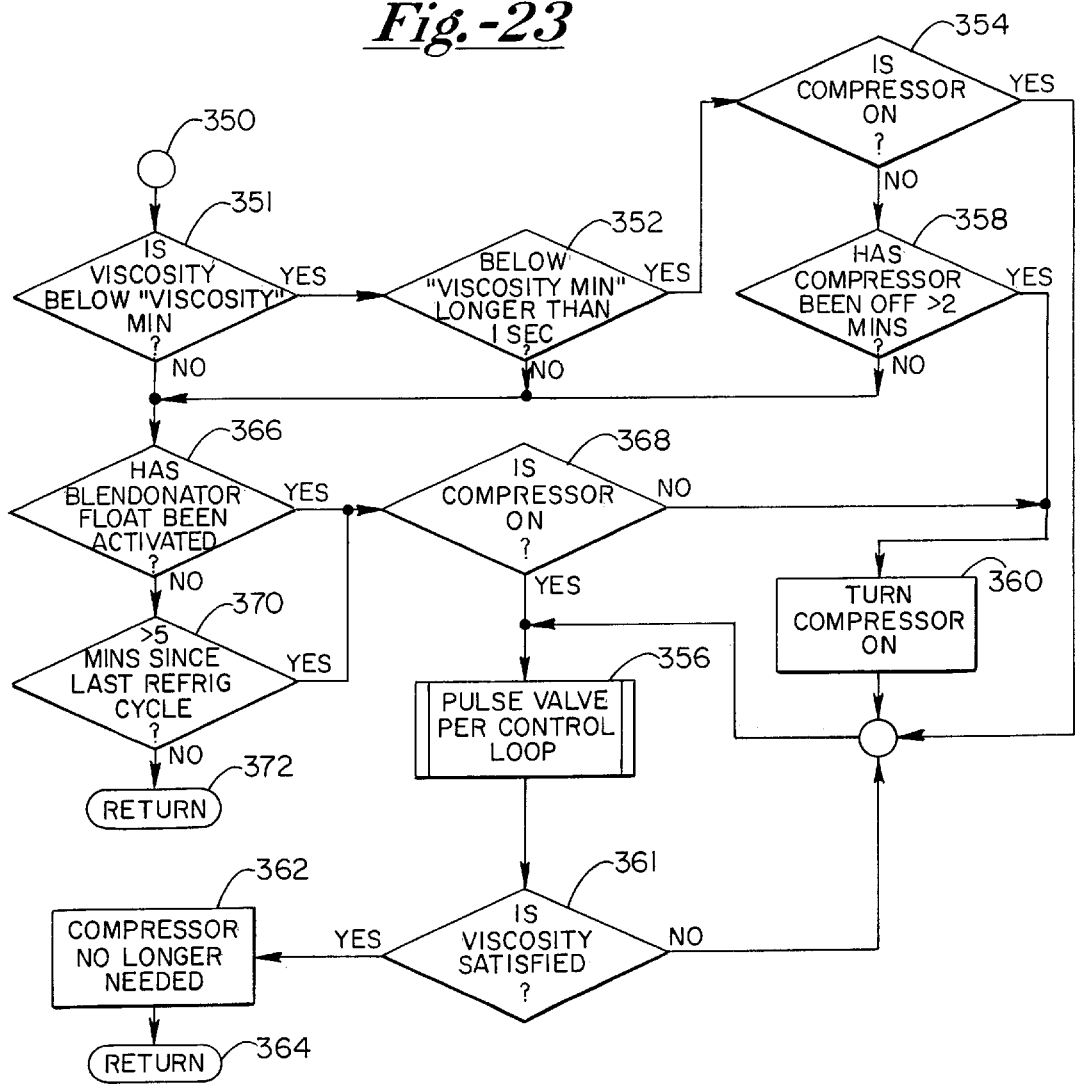
FIG. 23 shows a flow diagram of the viscosity monitoring control logic.

A better understanding of the control logic utilized by the control of the present invention to monitor the viscosity of the beverage, control the viscosity of the beverage and to regulate the ice bank can be had by referring to the flow diagrams thereof shown in FIGS. 23–26. Viscosity is monitored as a function of the current draw of the DC drive motor for the particular cylinder. In addition, each motor 217, as stated above, is controlled to operate at a constant 120 RPM rate. Thus, the more viscous the beverage the greater load and current draw on the motor 217 to maintain the set point rotational speed. Since the motors 217 are directly driving the cylinder scraper mechanisms, and the RPM's are kept constant, there exists a very direct correlation between the current draw of the motors and the viscosity of the food product. Each product delivery board has look up tables that correlate the current draw to an arbitrary viscosity number scale, which scale is utilized by each board to indicate a level of viscosity of the beverage within the cylinder. As seen in FIG. 23, a start point is indicated by block 350. The viscosity is monitored by each board 340, wherein at block 351 it is determined if the viscosity is below a preset viscosity minimum. If the viscosity is below that minimum, and it has been below that minimum for greater than one second, block 352, then at block 354, it is determined if compressor 270 is on. If compressor 270 is on, then the viscosity is controlled at block 356. A more detailed description of the viscosity control is contained below with reference to FIG. 24. If compressor 270 is not on, then the control inquires if it has been off for more than two minutes, block 358. If it has, then compressor 270 is turned on at block 360 and viscosity is controlled at block 356. At block 361, it is determined if the desired viscosity has attained a predetermined desired level. If it has, the compressor is turned off at block 362 and the control goes to return at block 364 and monitors the viscosity. If at blocks 351, 352 or 358 it is determined, respectively, that the viscosity is not below viscosity minimum or the viscosity minimum was not maintained for more than one second or that the compressor has been off for less than two minutes, then the control, at block 366, determines if the float sensor 252 of the associated bottle 224 has been activated to signal for more beverage to be pumped therein, i.e. has beverage been drawn from the associated cylinder whereby further beverage must be replaced therein, and in its associated carbonator/blender 224. If the float has been activated, then further beverage is added to the cylinder by control of pump 320 and operation of valves 304 and 316. The control then inquires, at block 368, if the compressor is on, and turns the compressor on as needed or proceed directly to viscosity control, block 356. If the sensor 252 has not been activated to deliver more beverage within its associated bottle 224, block 366, then the control determines if 5 minutes has elapsed since the last refrigeration cycle, block 370. If less than the 5 minutes has elapsed, the control goes to return, block 372 where viscosity is monitored. If more than 5 minutes have elapsed since the last operation of the compressor, the control then inquires, at block 368, if the compressor is on, and turns the compressor on as needed, block 360, or proceeds directly to viscosity control, block 356.

Figure 24:
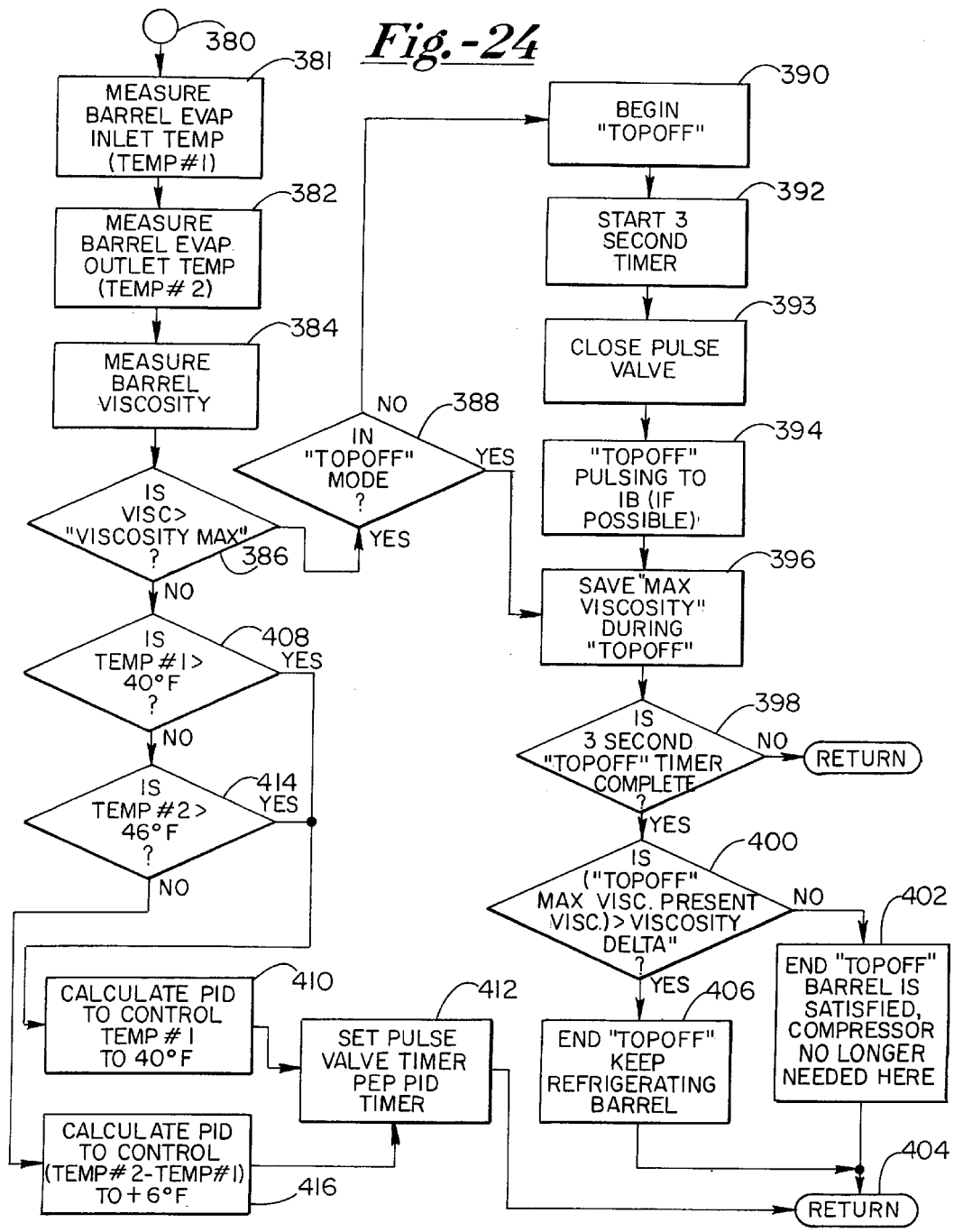
FIG. 24 shows a flow diagram of the viscosity control logic

The viscosity control of the present invention can be better understood in terms of the flow diagram of FIG. 24. At the start block 380 the control moves to blocks 381 and 382, where the board determines the inlet and outlet temperatures, respectively, of the particular evaporator coil 274, and at block 384, measures the barrel viscosity. At block 386 it is determined if the viscosity is greater than a pre-selected viscosity maximum. If it is, the control queries if the particular coil 274 is in the "top off mode", block 388. If not, the top off mode is begun at block 390. The top off mode is a sequence that permits a relatively accurate determination of the beverage viscosity. Thus, at block 392 a 3 second timer is started during which the associated pulse valve 276 is closed, block 393. Further refrigeration is stopped for this time period, however the scraper mechanism continues to turn. At block 394 pulse valve 280 is operated to provide for building of the ice bank. A further understanding of the control of the ice bank will be had below in reference to FIG. 25. At block 396, the maximum viscosity sensed during the top off period is recorded. If the 3 second timer has timed out, block 398, then the control determines if the difference between the present viscosity and the maximum viscosity currently sensed during top off is lesser or greater than a pre-selected viscosity delta or difference, block 400. The delta is contained in a look-up table and is an experimentally derived number. If the delta is not exceeded, this means that the viscosity of the beverage is at the desired level and refrigeration of the cylinder can be stopped, block 402, and the control can go to return 404. If the measured delta is too large, i.e. in excess of the preset delta, this indicates that the beverage is not viscous enough. Then the control goes to block 406 ending top off and continuing refrigeration and goes to return 404. Ice can not be built on evaporator 220 during refrigeration of either coil 274. Only when both cylinders are satisfied and/or are otherwise not being cooled. Thus, if the other cylinder evaporator 274 is being cooled, cooling of evaporator 220 is not permitted. Therefore, ice can be formed during top off if the other coil 274 is not being cooled or if both are in top off. As a consequence thereof, if top off has ended as the delta was too large, block 400, further cylinder cooling is required and cooling of evaporator 220 is stopped, if one or both cylinders 214 are in a refrigeration sequence. At block 386, if the viscosity is below the preset viscosity maximum, then at block 408 the temperature of the particular inlet of the associated coil 274, as measured by sensor 277a, is determined. If that temperature is greater than 40 degrees Fahrenheit, then a proportional/integral/differential "PID" calculation is made to control the temperature down to 40° F., block 410. As is understood in the control art, PID control generally follows the equation PID=$E_c(K_p)+(E_{p1}, E_{p2}\ldots E_c)K_i+((d)E/(d)t)K_d$. where Ec is the current error, $K_p$ is a proportional proportionality constant, $E_{p1}\ldots$ represent previous error values, $K_i$ is the integral proportionality constant, (d)E/(d)t is the rate of change of the error and $K_d$ is the associated differential proportionality constant. The value ($E_{p1}, E_{p2}\ldots E_c$) represents an equation, such as the averaging of the E values, that, multiplied by $K_i$ represents the portion of the PID valve that is based on the size of the error over time. The $E_c(K_p)$ value represents the portion of the PID valve that is based on the size of the currently measured error. All three variables can be used produce a very accurate understanding of how a particular target point is being approached. In the present invention, PID control is used to control to a 40 degree F. set point with a high degree of accuracy. The particular pulse valve 276 is operated accordingly, block 412, as per the PID output. If at block 408 the temperature of the inlet is less than 40 degrees F., then it is determined if the outlet temperature, as determined by sensor 277b, is greater than 46 degrees F., block 414. If that temperature is greater than 46 degree F., then the logic control returns to blocks 410 and 412 and controls the temperature of the inlet to 40 degrees F. Thus, the control is first seeking to establish a delta T of six degrees between the coil 274 inlet and outlet temperatures at a particular starting point where the inlet temperature is 40 degree F. and an outlet temperature is 46 degrees. When that is accomplished, then, at block 416, the PIED control can be used to simply control the delta T to 6 degrees F. whereby the inlet and outlet temperatures can fall below 40 and 46 respectively, as long as the delta T of 6 degrees between them is accurately maintained.

Figure 25:
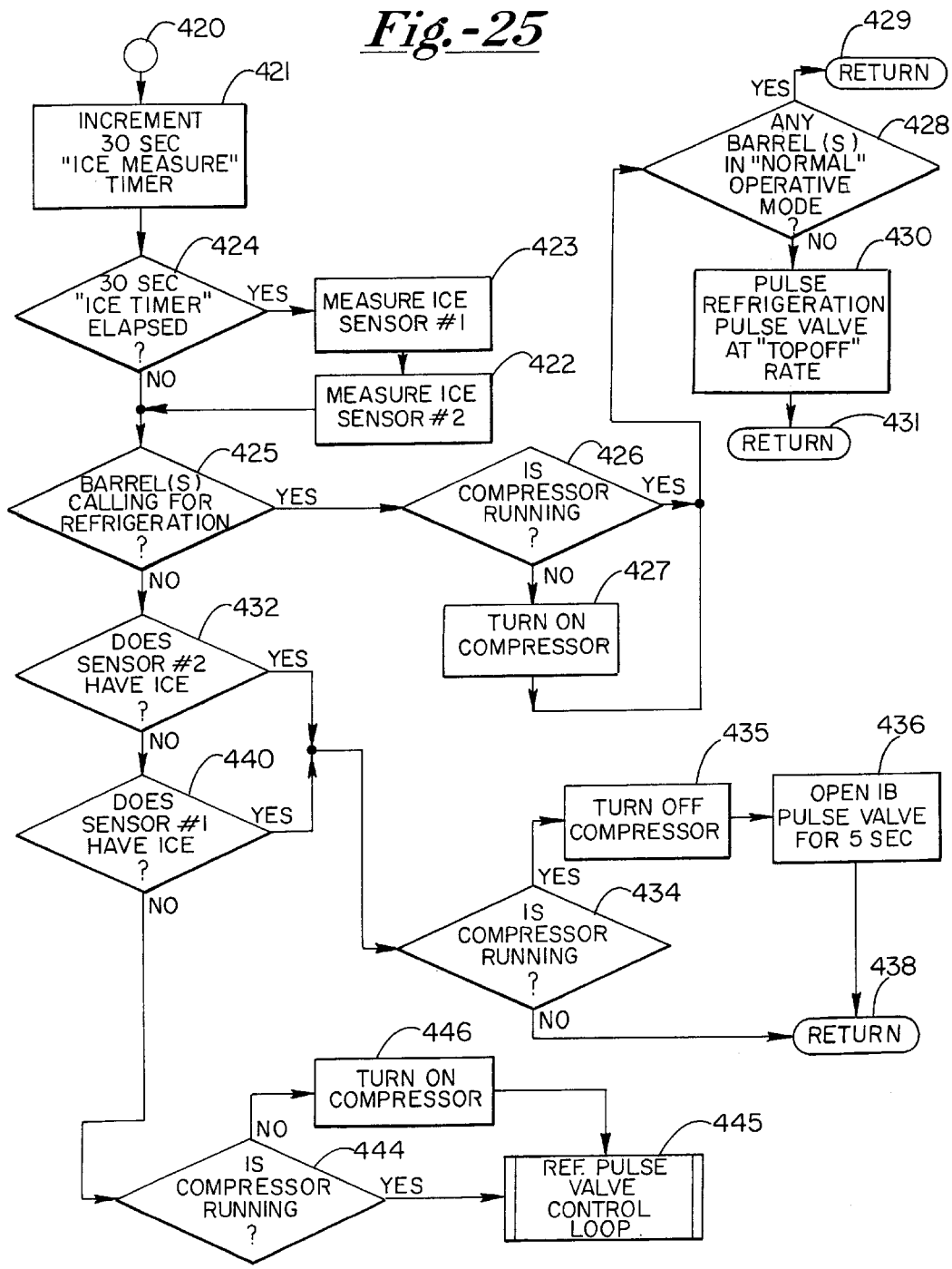
FIG. 25 shows a flow diagram of the ice bank forming control logic.

A better understanding of the ice bank control herein can be had with reference to FIG. 25. At the start point 420, the control then starts a 30 second ice measure timer, block 421.

During that 30 second interval ice sensors 288b and 288a are measured, respectively, blocks 422 and 423. After the 30 second timer has timed out, block 424, the control determines if either cylinder 214 is calling for refrigeration, block 425. If either cylinder is calling for refrigeration then it is determined if the compressor 270 is running, block 426. The compressor is then turned on, block 427, or the control goes directly to block 428. At block 428 it is determined if either cylinder is in a normal operate mode, i.e. not in top off and requiring refrigeration. If either cylinder is in a normal operating mode, then no refrigeration of the ice bank can occur and the control goes to return, block 429. If one or both are not in normal mode, i.e. in top off mode, then the particular pulse valve 276 is pulsed at the top off rate, block 430 and the control goes to return 431 the rate that is determined to maintain a 20 degree F. temp. If, at block 425, neither cylinder 214 is calling for refrigeration, then ice bank sensor 288b is polled to determine if ice is present, block 432. If sensor 288b senses ice, then no more building of ice is desirable so, if the compressor is running, block 434, it is turned off, block 435 and valve 280 is opened for 5 seconds to equalize pressure, block 436, and the control goes to return, 438. If sensor 288b does not sense ice, then at block 440, the control looks at sensor 288a to see if it senses ice. If sensor 288a so indicates, then the control follows blocks 434, 435, 436 and 438. If sensor 288a does not sense ice, then ice can and should be added to the ice bank, it having eroded to a point that a greater cooling reserve is desirable. Thus, at block 444, if the compressor is running, pulse valve 280 is operated to cool evaporator 220 and build ice thereon, block 445. If the compressor is not running, it is turned on, block 446. Pulse valve 280 is operated as per the flow diagram valve control loop delineated in FIG. 26 below.

As can be understood by referring to FIG. 26, at a start point 450, the control measures evaporator 220 inlet temperature using sensor 282a, block 452 and then measures the outlet temperature thereof using outlet sensor 282b, block 454. The delta T of evaporator 220 is controlled in substantially the same manner as previously described for the cylinders 214. Thus, the inlet temperature is first sensed, block 456, and moved down using a PID control, block 458, and a valve pulse timer as per that PID calculation, block 460, to a preset temperature of 20 degrees F. Once that value is attained, the control goes to return, block 462. If the inlet temperature is less than 20, then the control determines if the outlet temperature is greater than 40 degrees, block 464. If it is then the control returns to blocks 458 and 460 to move the inlet temperature to 20 degrees F. Once the inlet temperature is equal to 20 degrees F. and the outlet temperature is equal to −40 degrees F., then at block 464, the control then moves to block 466. At block 466 a PID control is utilized to maintain a delta T of 20 degrees F. The pulse valve 280 is set accordingly, block 468, and the control goes to return, block 270.

Those of skill will understand that the present invention provides for the production of a semi-frozen food product in a manner that maximizes the efficiency of operation of the refrigeration system thereof. The life of the compressor is extended as refrigerant gas can be alternately directed to either of the cylinder evaporators 274 or the ice bank evaporator 220. In particular, the two ice bank sensors provide for an incremental area between an ice bank maximum size and an ice bank minimum size where the ice bank can be grown to prevent the compressor from running and building pressure after both the valves 276 are closed. In this manner the compressor is not short cycled or presented with damaging high pressures when an expansion valve is closed.

Since the erosion of the ice bank generally occurs at a faster rate than it is built up, it is contemplated that there will be very few or no occasions where the refrigerant can not be diverted to evaporator 220 so as to protect the compressor.

Furthermore, as an ice bank is used, a large cooling reserve can be built up during the times that neither cylinder 214 is calling for refrigeration, such as when the beverage therein is of sufficient viscosity, or where the cylinders have been shut down entirely during a "sleep mode", well known in the art, where no drinks will be dispensed. Also, as the PID control permits a much smaller delta T to be maintained in a safe manner, better efficiency of cooling is obtained from evaporators 274 and evaporator 220. Dispenser 200 therefore has a substantial advantage over comparable prior art machines in terms of refrigeration system design parameters. Dispenser 200 can use a much smaller compressor to do the work of a larger compressor in a prior art machine, or obtain more cooling from the same sized system.

As seen by again referring to FIG. 3, framework 213 defines three areas 500, 502 and 504. Top area 500 will be understood to retain water bath 218, condenser 272 and compressor 270. Middle area 502 retains cylinder packs 216, and the expansion valves 276 and 280 and the defrost valves 278. Lower section 504 includes beverage pumps 320 and ratio valves 304 and 316. As is known in the art, defrost valves 278 serve to provide hot gas defrost of each cylinder 214. Such defrost is periodically required to remove large particles of ice that can periodically form within a cylinder. A filter grate, not shown, is secured to condenser 272 on the exterior side of beverage machine 200 opposite from the fan 273 thereof.

What is claimed is:

1. A semi frozen food product producing machine, comprising:
a refrigeration system having a first evaporator and a second evaporator,
a freeze cylinder having a scraping mechanism for harvesting frozen food product formed thereon, the first evaporator for cooling the cylinder,
a water bath tank, the water bath tank for holding a volume of water and containing the second evaporator for cooling of the volume of water therein, and the tank containing a heat exchange beverage tube for providing fluid communication between a source of beverage and a fluid containing bottle, the bottle also retained within the tank, and the bottle fluidly connected to the freeze cylinder.

2. The machine as defined in claim 1, and the refrigeration system including a control for control thereof so that the second evaporator is not cooled while the first evaporator is being cooled.

3. The machine as defined in claim 2, and the second evaporator cooled to produce an ice bank thereon.

4. A semi frozen food product producing machine, comprising:
a refrigeration system for cooling a first evaporator and a second evaporator,
a freeze cylinder for forming the semi-frozen food product, the first evaporator for cooling the cylinder,
a water bath tank, the water bath tank for holding a volume of water and containing the second evaporator for cooling of the volume of water therein, and the tank containing a heat exchange beverage tube for providing fluid communication between a source of beverage and the freeze cylinder.

5. The machine as defined in claim 4, and further including a first flow control device connected to a source of potable water and a second flow control device connected to a source of beverage syrup and the first and second flow control devices having outlets connected to a common line, the common line fluidly connected to an inlet of the heat exchange beverage tube.

6. The machine as defined in claim 5, and including a fluid flow sensor for sensing the flow of beverage syrup from the source thereof.

7. The machine as defined in claim 6, and the fluid flow sensor of the piston fluid sensing type.

8. The machine as defined in claim 4, and including a fluid flow sensor for sensing the flow of beverage syrup from the source thereof.

9. The machine as defined in claim 8, and the fluid flow sensor of the piston fluid contact type.

10. A semi frozen food product producing machine, comprising:
a refrigeration system for cooling a first evaporator and a second evaporator,
a freeze cylinder having a mechanism for harvesting frozen food product formed therein, the first evaporator for cooling the cylinder,
a water bath tank, the water bath tank for holding a volume of water and containing the second evaporator for cooling of the volume of water therein, and
a heat exchange fluid reservoir in the water bath, the fluid reservoir for holding a volume of beverage therein and having an inlet fluidly connected to a source of beverage and an outlet connected to the freeze cylinder.

11. The machine as defined in claim 10, and the fluid reservoir comprising a tube.

12. The machine as defined in claim 10, and the fluid reservoir comprising a blending cylinder.

13. The machine as defined in claim 12, and the blending cylinder having a second inlet for connection thereof to a source of pressurized carbon dioxide gas for carbonating the beverage contents thereof.

14. The machine as defined in claim 10, and further including a first flow control device connected to a source of potable water and a second flow control device connected to a source of beverage syrup and the first and second flow control devices having outlets connected to a common line, the common line fluidly connected to the inlet of the fluid container.

15. The machine as defined in claim 14, and including a fluid flow sensor for sensing the flow of beverage syrup from the source thereof.

16. The machine as defined in claim 15, and the fluid flow sensor of the piston fluid sensing type.

17. The machine as defined in claim 11, and further including a first flow control device connected to a source of potable water and a second flow control device connected to a source of beverage syrup and the first and second flow control devices having outlets connected to a common line, the common line fluidly connected to the inlet of the fluid container.

18. The machine as defined in claim 17, and including a fluid flow sensor for sensing the flow of beverage syrup from the source thereof.

19. The machine as defined in claim 18, and the fluid flow sensor of the piston fluid sensing type.

20. The machine as defined in claim 12, and further including a first flow control device connected to a source of potable water and a second flow control device connected to a source of beverage syrup and the first and second flow control devices having outlets connected to a common line, the common line fluidly connected to the inlet of the fluid container.

21. The machine as defined in claim 20, and including a fluid flow sensor for sensing the flow of beverage syrup from the source thereof.

22. The machine as defined in claim 21, and the fluid flow sensor of the piston fluid sensing.

23. A semi frozen food product producing machine, comprising:
a refrigeration system for cooling a first evaporator and a second evaporator,
a freeze cylinder for producing the semi-frozen food product therein, the first evaporator for cooling the freeze cylinder,
a water bath tank, the water bath tank for holding a volume of water and containing the second evaporator for cooling of the volume of water therein, and the tank containing a heat exchange beverage tube for providing fluid communication between a source of beverage and a blending cylinder in the water bath, the blending cylinder having an enclosed interior for receiving beverage therein through a first inlet thereof, the first inlet connected to the heat exchange beverage tube, and the water bath for cooling the beverage contents of the blending cylinder and the beverage tube, and the blending cylinder having an outlet for permitting fluid connection thereof to the freeze cylinder, and the blending cylinder having a second inlet for connection thereof to a source of pressurized carbon dioxide gas for carbonating the beverage contents thereof.

24. The machine as defined in claim 23, and further including a first flow control device connected to a source of potable water and a second flow control device connected to the source of beverage syrup and the first and second flow control devices having outlets connected to a common line, the common line fluidly connected to an inlet end of the heat exchange beverage tube.

25. The machine as defined in claim 24, and including a fluid flow sensor for sensing the flow of beverage syrup from the source thereof.

26. The machine as defined in claim 25, and the fluid flow sensor of the piston fluid sensing type.

27. A method of operating a semi-frozen food product producing machine, the machine having a freeze cylinder for producing a semi-frozen food product therein, the freeze cylinder cooled by a first evaporator, a water bath tank cooled by a second evaporator for forming an ice bank thereon and including an ice bank sensor for sensing predetermined maximum and minimum ice bank size, and the first evaporator and the second evaporator cooled by a common refrigeration system, and a beverage line connected to a source of beverage and to the freeze cylinder, and the beverage line having a heat exchange portion within the water bath tank, and a viscosity sensor for sensing the viscosity of the beverage in the freeze cylinder, the steps comprising:
continuously sensing the viscosity of the beverage in the freeze cylinder,
operating the refrigeration system to provide cooling of the first evaporator,
stopping the cooling of the first evaporator for stopping the cooling of the beverage in the freeze cylinder when the viscosity of the beverage therein is sensed to have reached a predetermined maximum viscosity,
continuing to run the refrigeration system after stopping the cooling of the first evaporator and switching to cooling of the second evaporator for forming an ice bank thereon.

28. The method as defined in claim 27, and including the further steps of:
stopping the cooling of the second evaporator if the beverage contents of the freeze cylinder goes below a predetermined viscosity minimum, and substantially simultaneously switching back to cooling only the first evaporator while continuing to run the refrigeration system.

29. The method as defined in claim 27, and including the further steps of continuing the cooling of the second evaporator for formation of the ice bank thereon as long as the ice bank is below the maximum predetermined size and cooling of the first evaporator is not required as the viscosity of the beverage is not below the predetermined viscosity minimum.

30. The method as defined in claim 27, and including the further steps of continuing the operation of the refrigeration system as long as either the first evaporator needs cooling as the viscosity of the beverage is below the predetermined minimum thereof and less than the predetermined maximum thereof or the ice bank on, a second evaporator is below the predetermined maximum permissive size.

31. A semi frozen food product producing machine, comprising:

a refrigeration system for cooling a first evaporator and a second evaporator, a freeze cylinder having a mechanism for harvesting frozen food product formed therein the harvesting mechanism driven by a drive motor, the first evaporator for cooling the cylinder, a water bath tank, the water bath tank for holding a volume of water and containing the second evaporator for cooling of the volume of water therein, and a fluid container in the water bath, the fluid container having an enclosed interior for receiving a beverage therein through a first inlet thereof, the water bath for cooling the beverage contents of the fluid container, and the fluid container having an outlet for permitting fluid connection to the freeze cylinder, and a control having input from inlet and outlet sensors for determining inlet and outlet temperatures respectively of the first and second evaporators, a viscosity sensor for determining the viscosity of the beverage within the freeze cylinder and an ice bank sensor for determining maximum and minimum size of an ice bank formed on the second evaporator, and the control operating the refrigeration system to cool the first evaporator when the viscosity of the beverage therein is sensed as being below a predetermined minimum viscosity, and the control not cooling the second evaporator while the first evaporator is being cooled.

32. The machine as defined in claim 31, and the control stopping the cooling of the first cylinder if the viscosity sensor determines that the viscosity of the beverage therein has reached a predetermined viscosity maximum and the control continuing the operation of the refrigeration system to provide for cooling of the second evaporator to form an ice bank thereon if the ice bank sensor determines that the ice bank is below the maximum ice bank size.

33. The machine as defined in claim 31, and the harvesting mechanism comprising a scraper bar rotatably mounted within the freeze cylinder and rotated by the drive motor at a predetermined constant revolutions per minute, the drive motor being an electric motor and the viscosity sensor comprising a sensor for determining the current draw of the drive motor wherein increases or decreases therein correspond to increases and decreases respectively to the viscosity of the beverage within the freeze cylinder.

34. The machine as defined in claim 33, and the drive motor being of the brushless DC type.

35. The machine as defined in claim 34, and the drive motor including a stator secured to and around a first closed end of the freeze cylinder and a magnetic rotor within the freeze cylinder and rotatably mounted therein adjacent the first end and connected to the scraper bar.

36. The machine as defined in claim 31, and the control using a proportional/integral/differential control process to control the inlet and outlet temperatures of the first evaporator to a predetermined difference there between.

37. The machine as defined in claim 31, and the control using a proportional/integral/differential control process to control the inlet and outlet temperatures of the second evaporator to a predetermined difference there between.

38. The machine as defined in claim 37, and the control using a proportional/integral/differential control process to control the inlet and outlet temperatures of the second evaporator to a predetermined difference there between.

\* \* \* \* \*